(12) United States Patent
Doshi et al.

(10) Patent No.: US 9,910,669 B2
(45) Date of Patent: Mar. 6, 2018

(54) INSTRUCTION AND LOGIC FOR CHARACTERIZATION OF DATA ACCESS

(71) Applicant: Intel Corporation, Santa Clara, CA (US)

(72) Inventors: Kshitij A. Doshi, Chandler, AZ (US); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 14/752,014

(22) Filed: Jun. 26, 2015

(65) Prior Publication Data

US 2016/0378473 A1    Dec. 29, 2016

(51) Int. Cl.
*G06F 9/312* (2006.01)
*G06F 9/44* (2006.01)
*G06F 9/30* (2018.01)
*G06F 12/1027* (2016.01)

(52) U.S. Cl.
CPC ...... *G06F 9/30029* (2013.01); *G06F 9/30047* (2013.01); *G06F 9/30145* (2013.01); *G06F 12/1027* (2013.01); *G06F 2212/452* (2013.01); *G06F 2212/68* (2013.01)

(58) Field of Classification Search
CPC ............ G06F 9/30029; G06F 9/30047; G06F 9/30145; G06F 12/0875; G06F 12/0891; G06F 12/1009; G06F 12/1027; G06F 2212/452; G06F 2212/68; G06F 2212/684
USPC .................. 712/213, 217, 227; 711/202–209
See application file for complete search history.

(56) References Cited

U.S. PATENT DOCUMENTS

| | | | |
|---|---|---|---|
| 2007/0283115 A1* | 12/2007 | Freeman | G06F 12/1475 711/163 |
| 2012/0117301 A1* | 5/2012 | Wingard | G06F 12/1027 711/6 |
| 2013/0024597 A1* | 1/2013 | Loh | G06F 12/1009 711/3 |

OTHER PUBLICATIONS

Intel, "IA-32 Intel® Architecture Software Developer's Manual vol. 2: Instruction Set Reference", Intel Corporation, 978 pages, 2003.

* cited by examiner

*Primary Examiner* — Daniel Pan
(74) *Attorney, Agent, or Firm* — Alliance IP, LLC

(57) ABSTRACT

A processor includes a front end to receive an instruction, a decoder to decode the instruction, a core to execute the first instruction, and a retirement unit to retire the first instruction. The core includes logic to execute the first instruction, including logic to repeatedly record a translation lookaside buffer (TLB) until a designated number of records are determined, and flush the TLB after a flush interval.

20 Claims, 30 Drawing Sheets

| 127 | 120 119 | 112 111 | 104 103 | | 24 23 | 16 15 | 8 7 | 0 |
|---|---|---|---|---|---|---|---|---|
| bbbb bbbb | bbbb bbbb | bbbb bbbb | • | • | • | bbbb bbbb | bbbb bbbb | bbbb bbbb |

UNSIGNED PACKED BYTE REPRESENTATION 344

| 127 | 120 119 | 112 111 | 104 103 | | 24 23 | 16 15 | 8 7 | 0 |
|---|---|---|---|---|---|---|---|---|
| sbbb bbbb | sbbb bbbb | sbbb bbbb | • | • | • | sbbb bbbb | sbbb bbbb | sbbb bbbb |

SIGNED PACKED BYTE REPRESENTATION 345

| 127 | 112 111 | | 16 15 | 0 |
|---|---|---|---|---|
| wwww wwww wwww wwww | • | • | • | wwww wwww wwww wwww |

UNSIGNED PACKED WORD REPRESENTATION 346

| 127 | 112 111 | | 16 15 | 0 |
|---|---|---|---|---|
| swww wwww wwww wwww | • | • | • | swww wwww wwww wwww |

SIGNED PACKED WORD REPRESENTATION 347

| 127 | 92 91 | 32 31 | 0 |
|---|---|---|---|
| dddd dddd dddd dddd dddd dddd dddd dddd | • • • | dddd dddd dddd dddd dddd dddd dddd dddd | |

UNSIGNED PACKED DOUBLEWORD REPRESENTATION 348

| 127 | 92 91 | 32 31 | 0 |
|---|---|---|---|
| sddd dddd dddd dddd dddd dddd dddd dddd | • • • | sddd dddd dddd dddd dddd dddd dddd dddd | |

SIGNED PACKED DOUBLEWORD REPRESENTATION 349

FIG. 3C

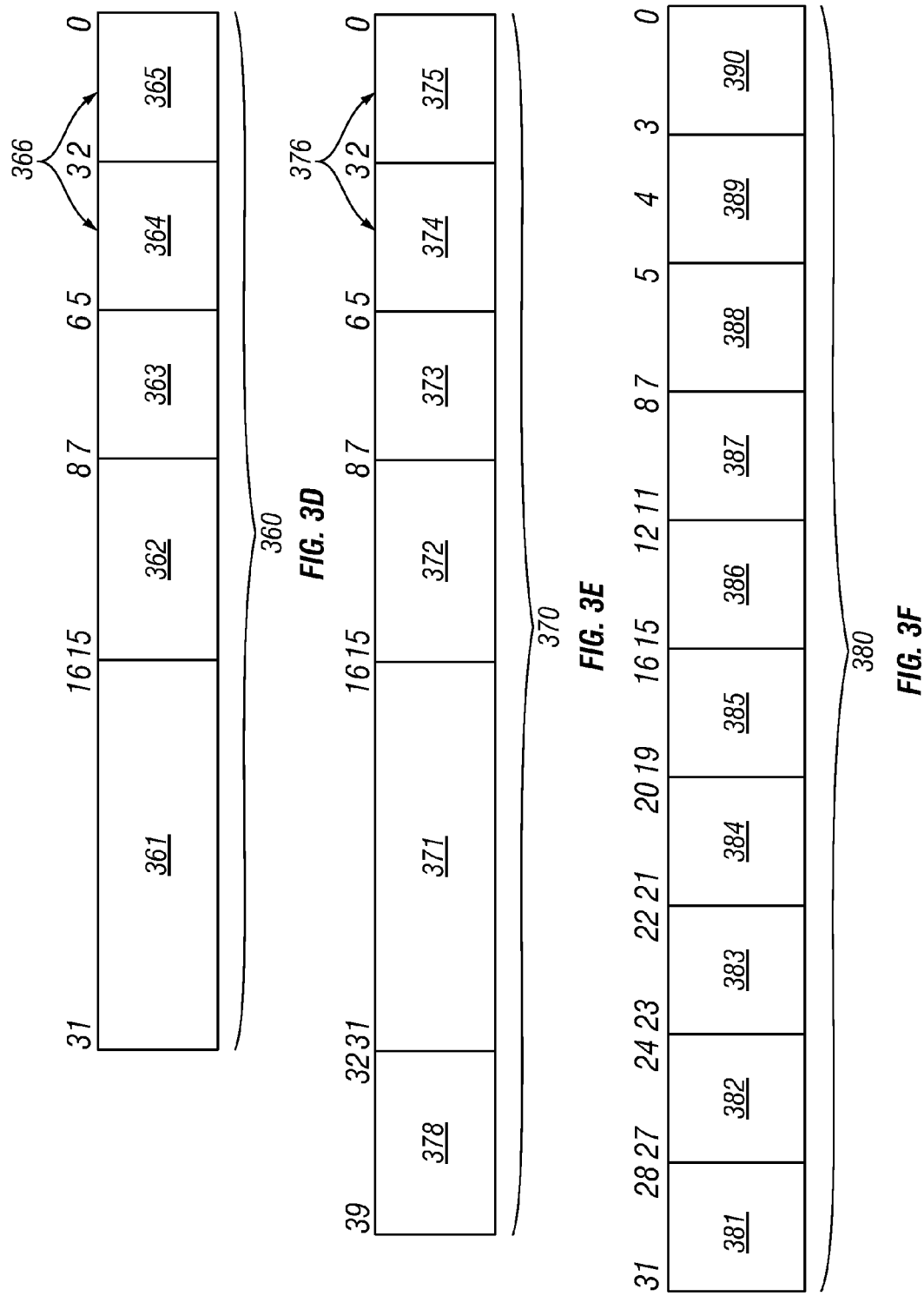

US 9,910,669 B2

INSTRUCTION AND LOGIC FOR CHARACTERIZATION OF DATA ACCESS

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native, or more native, for execution on the processor. Processors may be implemented in a system on chip.

DESCRIPTION OF THE FIGURES

Embodiments are illustrated by way of example and not limitation in the Figures of the accompanying drawings:

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

DETAILED DESCRIPTION

Figure 1A:
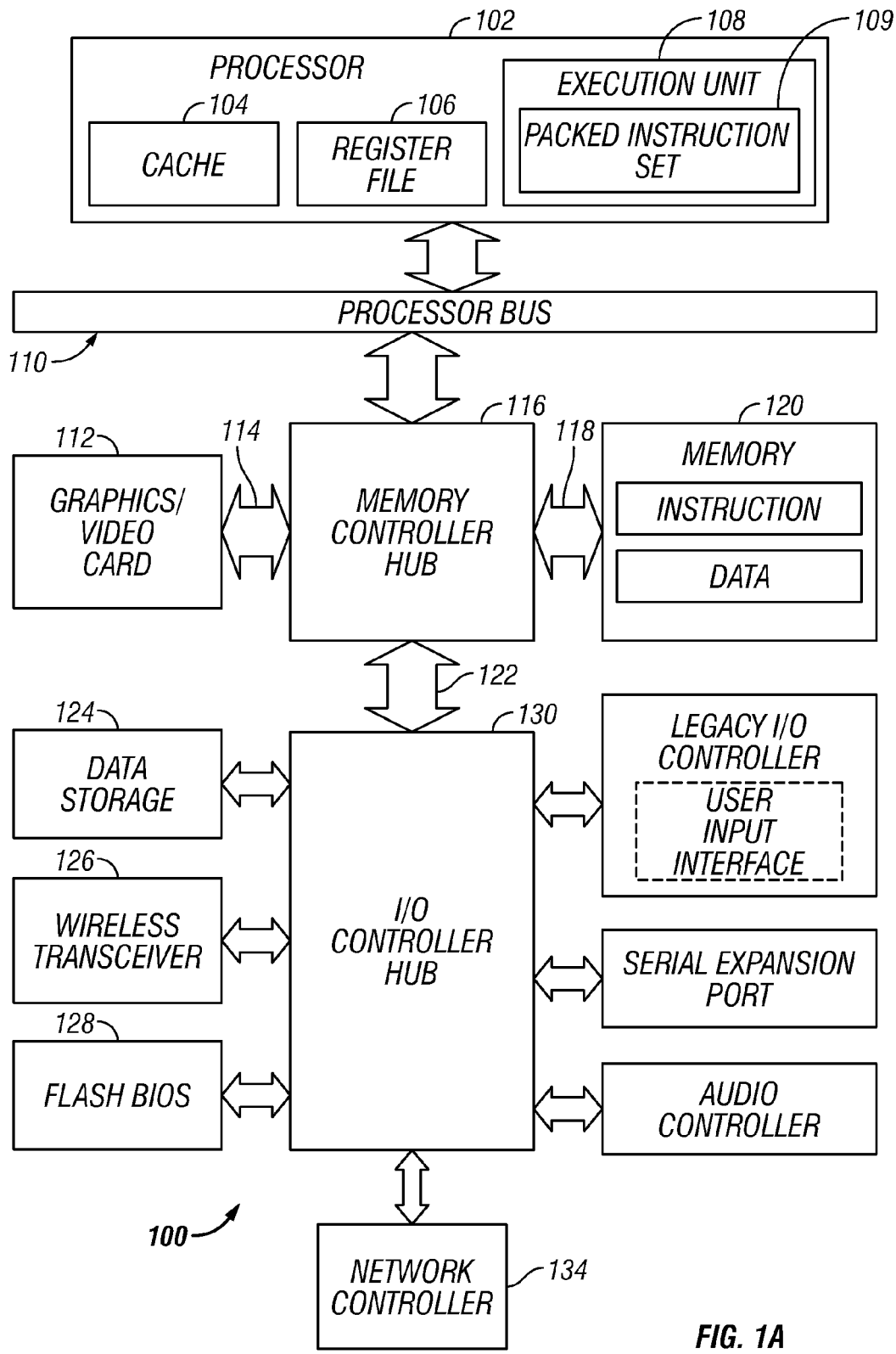
FIG. 1A is a block diagram of an exemplary computer system formed with a processor that may include execution units to execute an instruction, in accordance with embodiments of the present disclosure.

The following description describes an instruction and processing logic for code compression on a processing apparatus. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
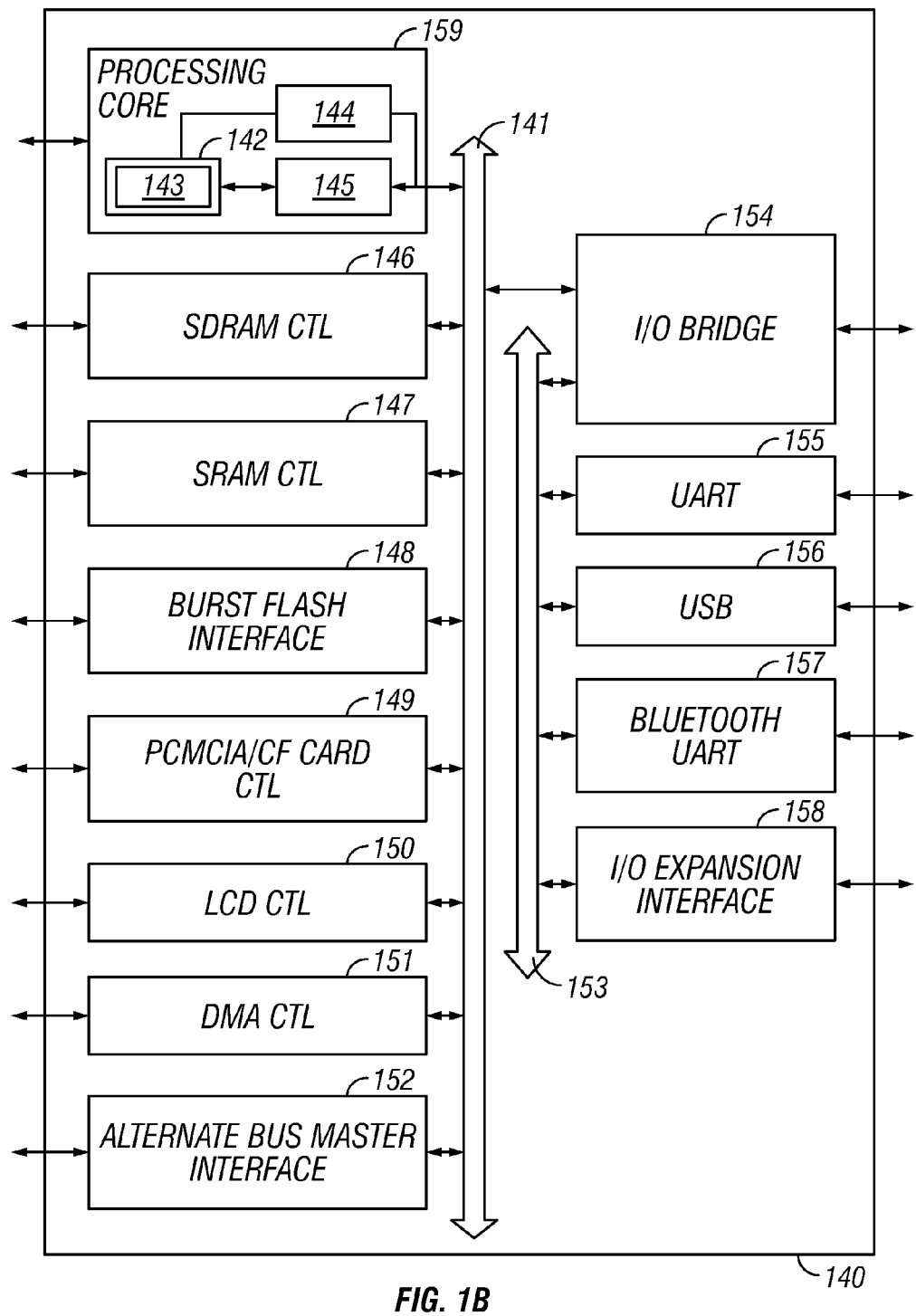
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
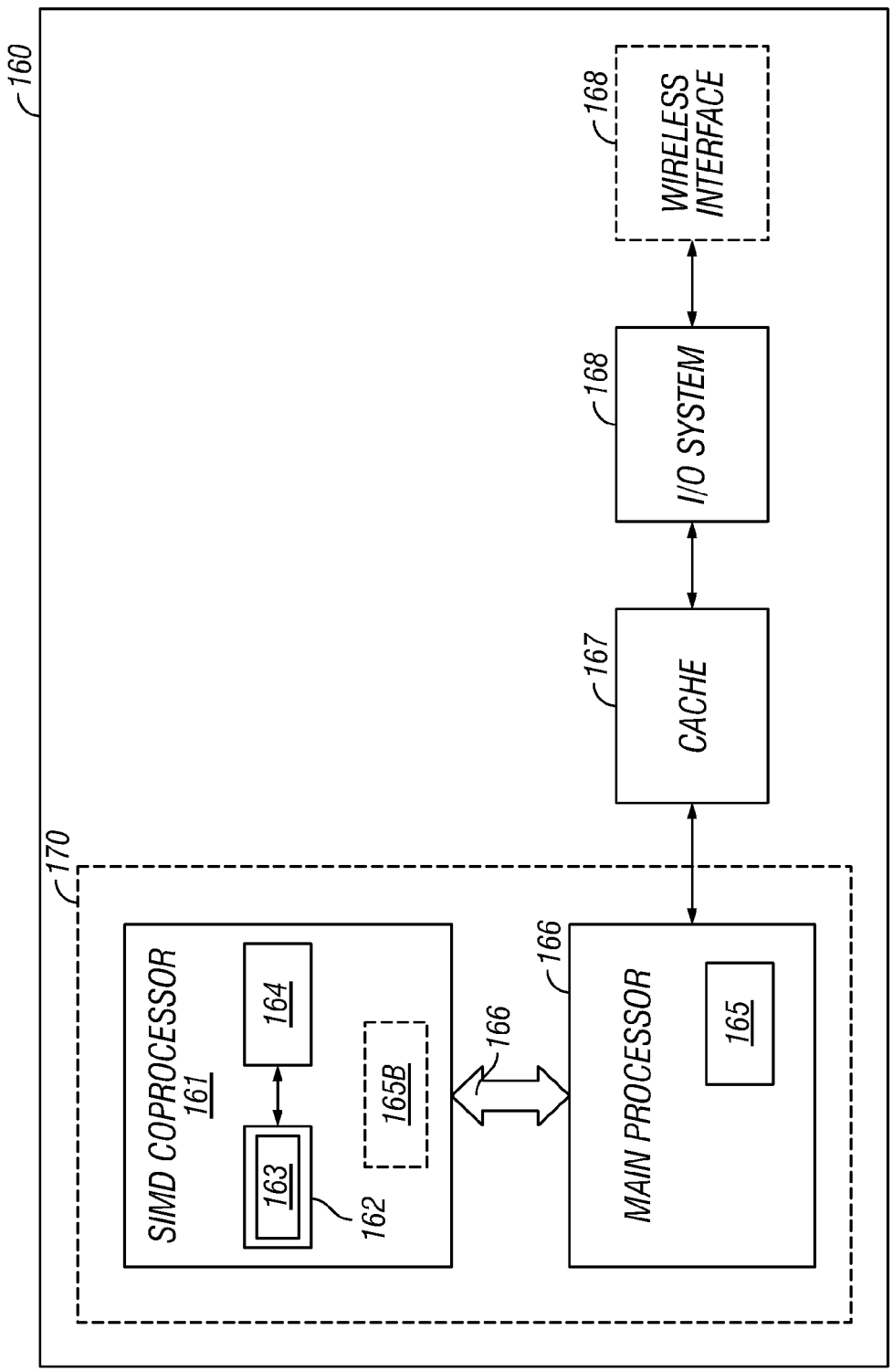
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
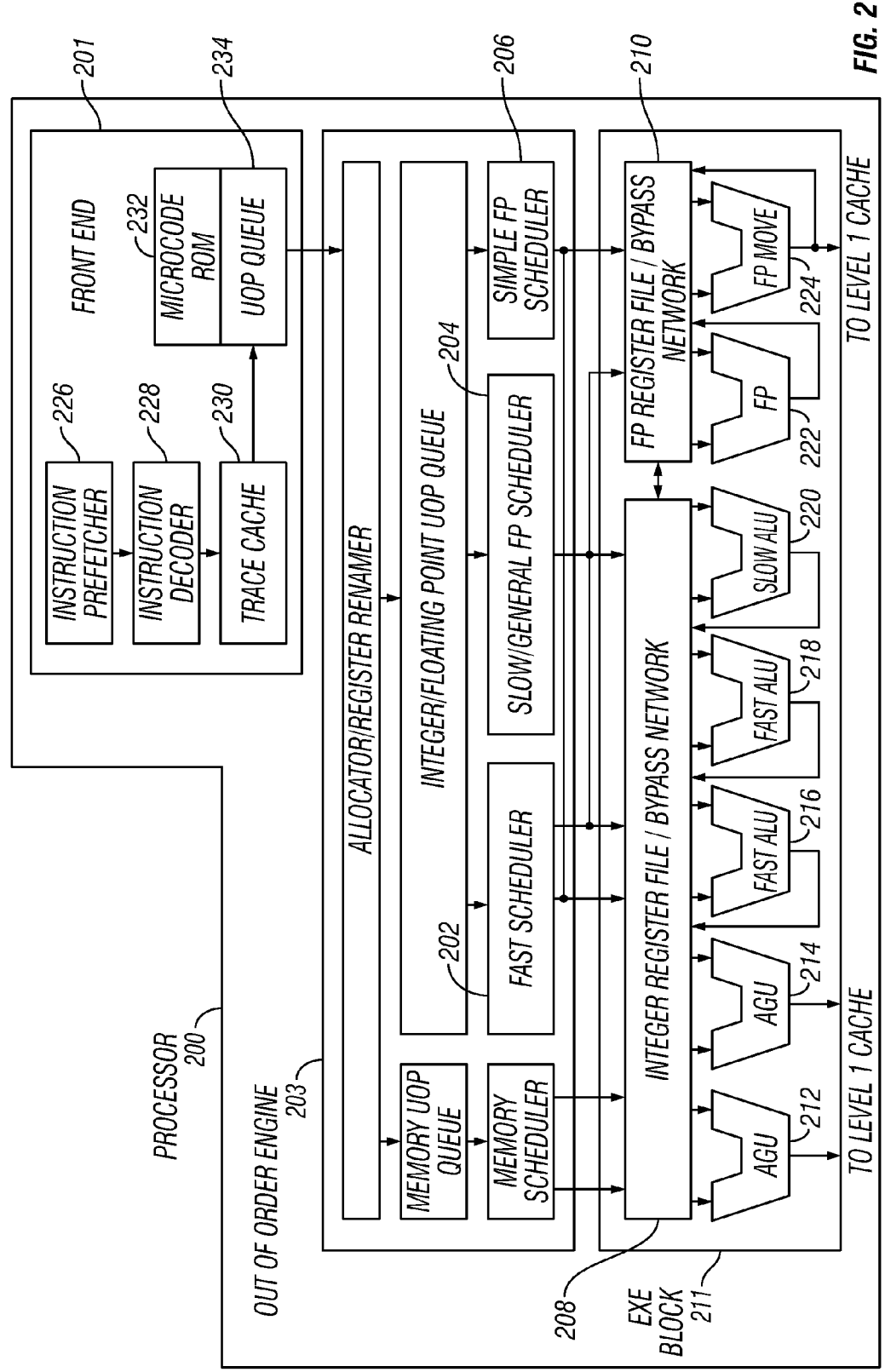
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single microop, whereas others need several micro-ops to complete the full operation. In one embodiment, if more than four microops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX' registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
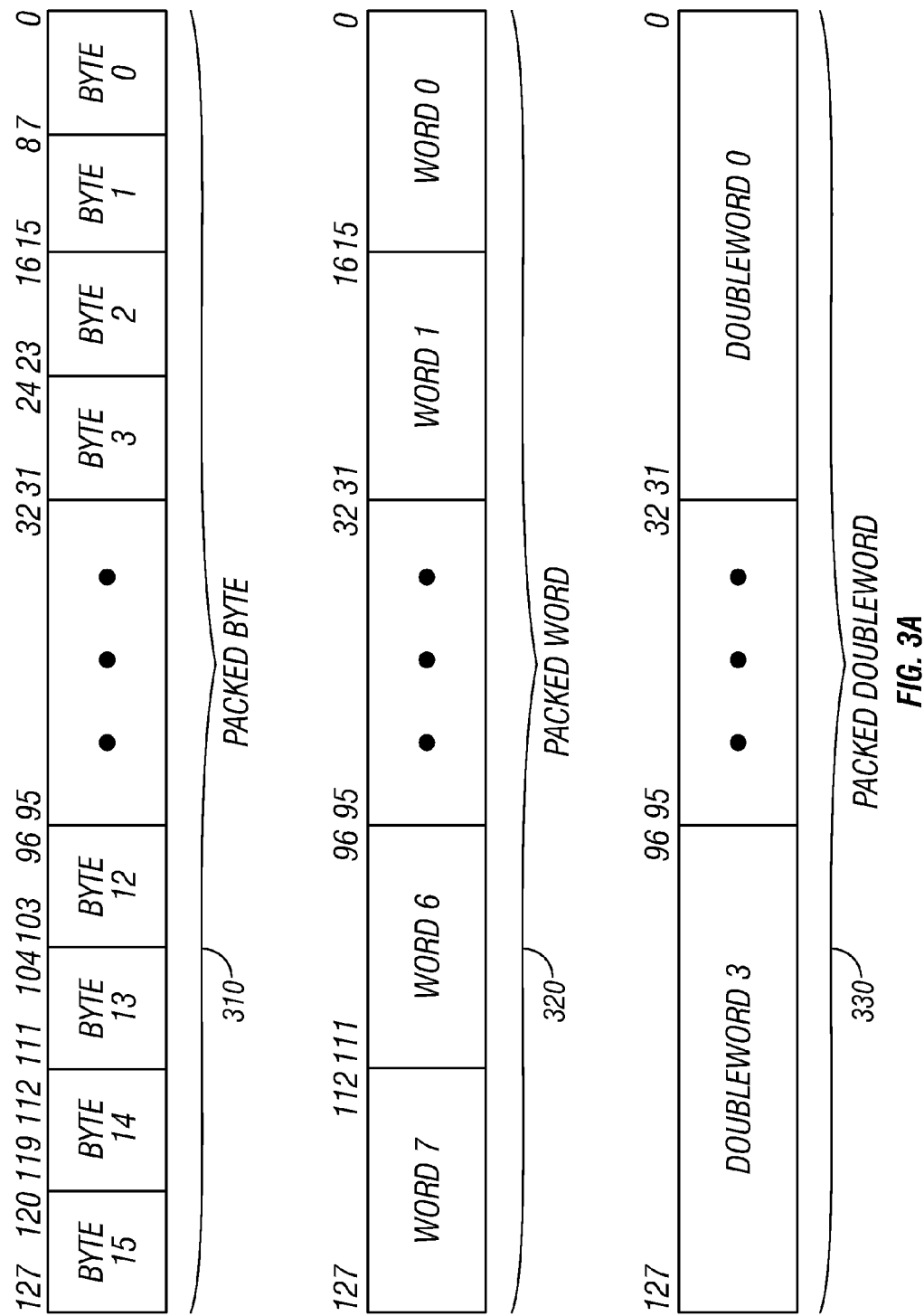
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

Figure 3B:
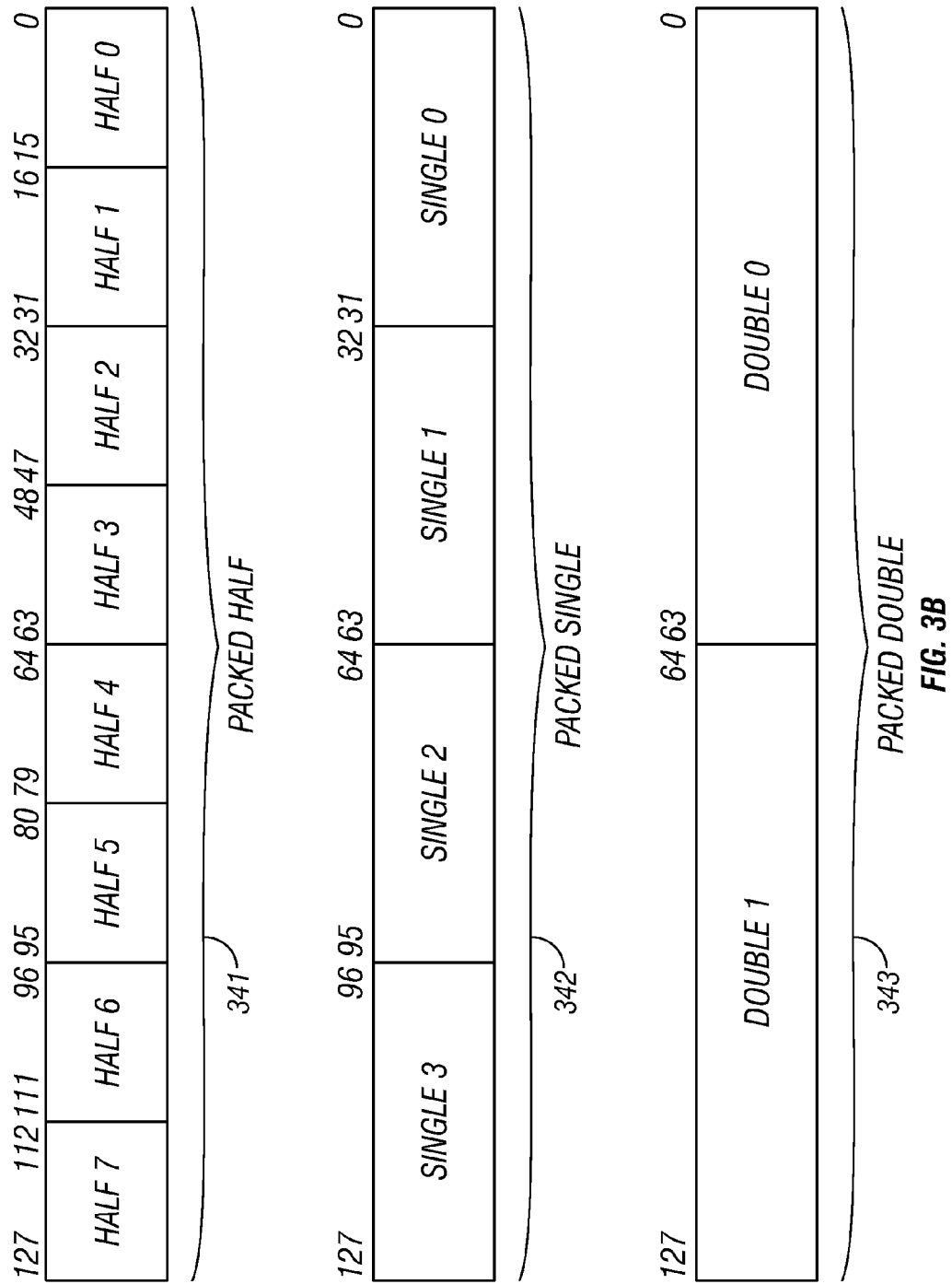
FIG. 3B illustrates possible in-register data storage formats, in accordance with embodiments of the present disclosure.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel-.com/design/litcentr. In one embodiment, and instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and over-flow (V) detection may be done on SIMD fields. For some instructions, the type of saturation may be encoded by field 384.

Figure 4A:
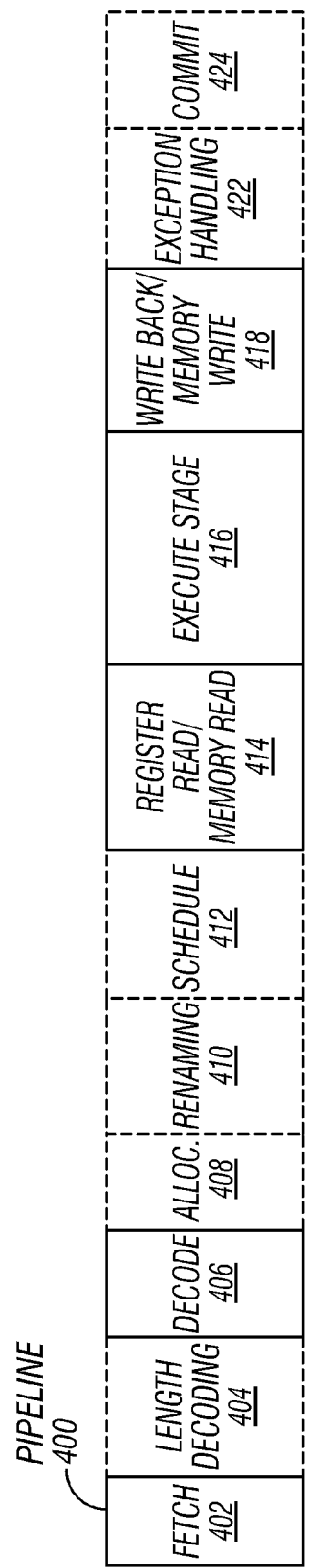
FIG. 4A is a block diagram illustrating an in-order pipeline and a register renaming stage, out-of-order issue/execution pipeline, in accordance with embodiments of the present disclosure.
Figure 4B:
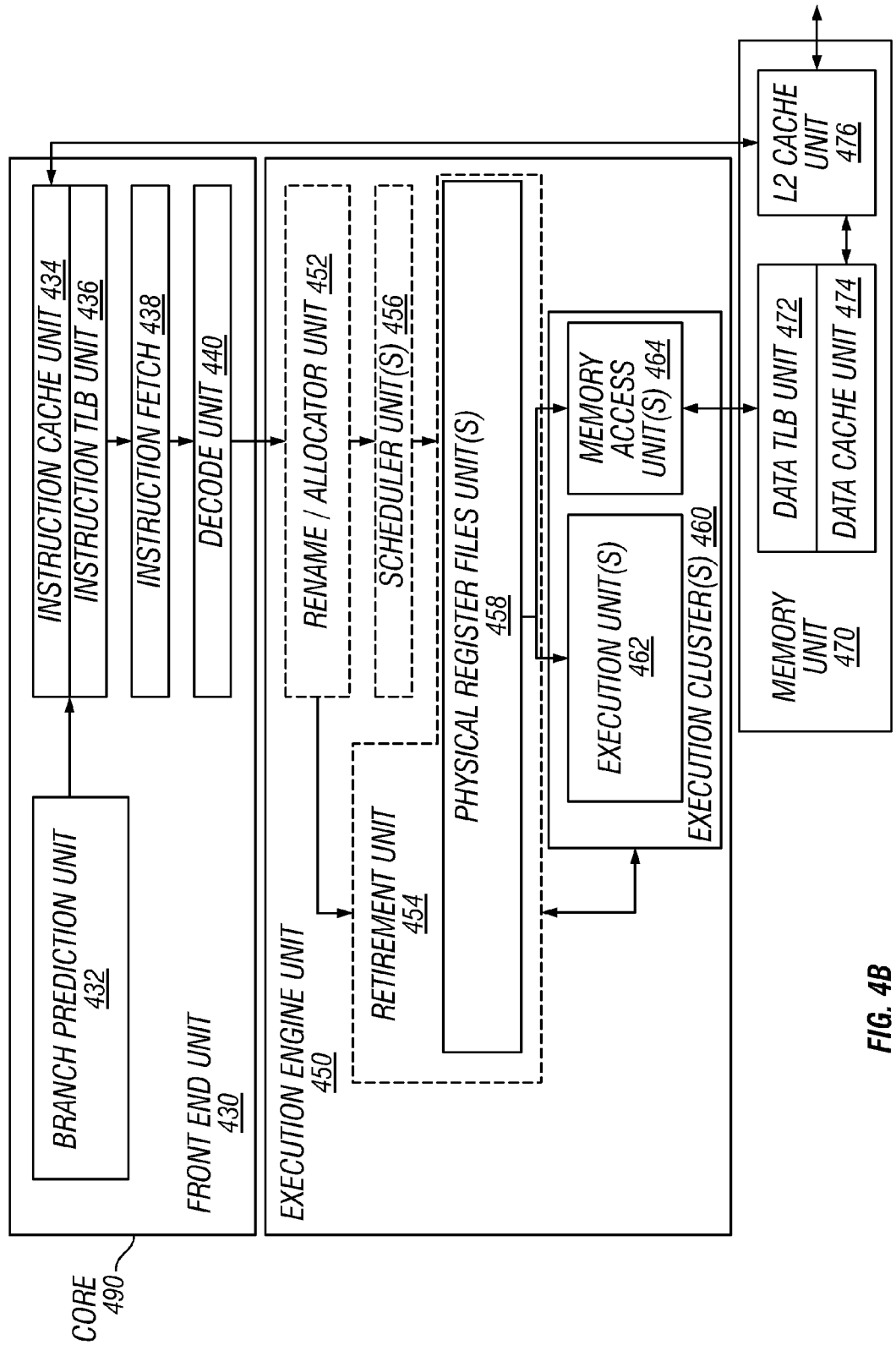
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 154 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Figure 5A:
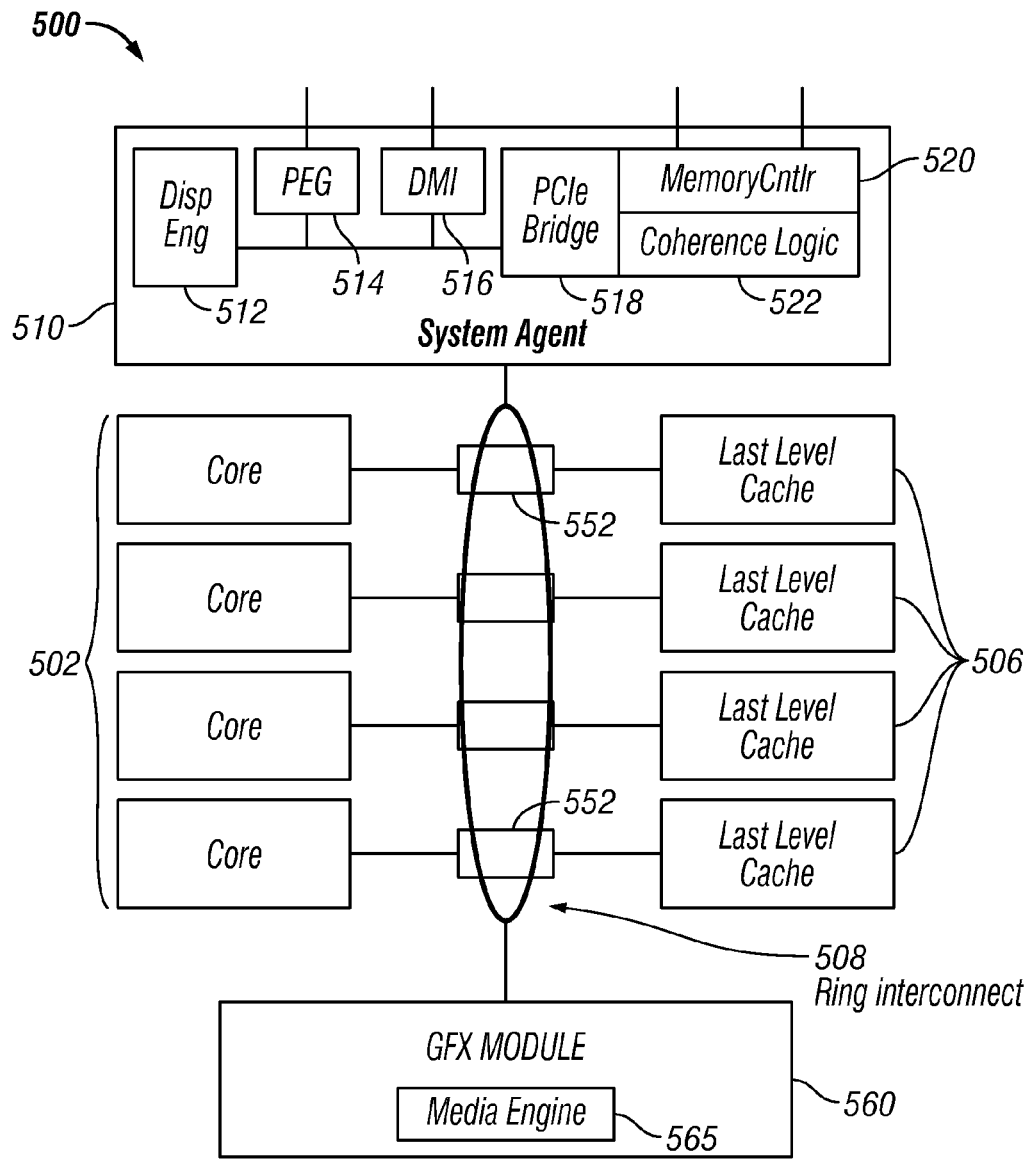
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 1214 for communications busses for graphics. In one embodiment, interface 1214 may be implemented by PCI Express (PCIe). In a further embodiment, interface 1214 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 1218 for providing PCIe links to other elements of a computing system. PCIe bridge 1218 may be implemented using a memory controller 1220 and coherence logic 1222.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
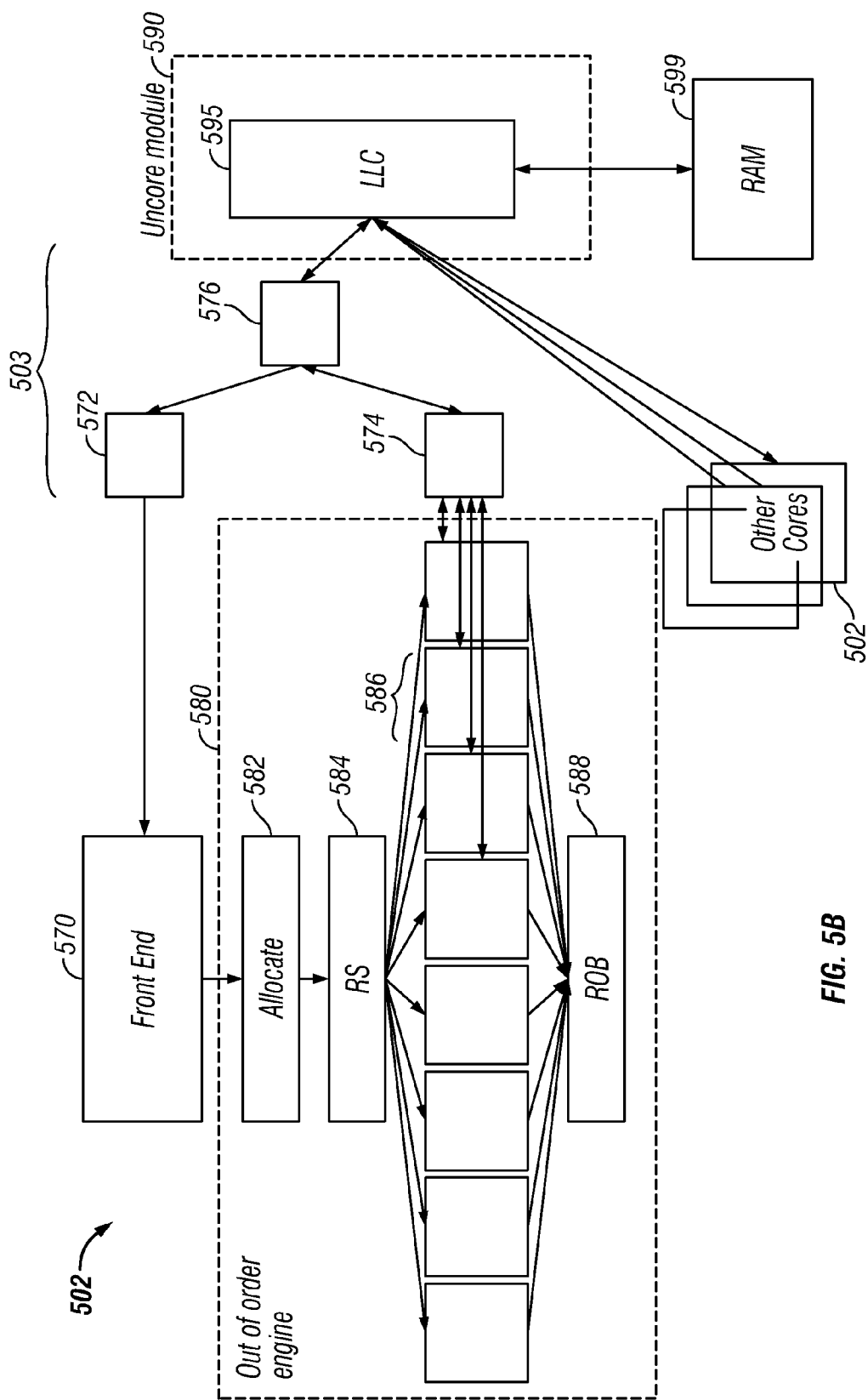
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 1282. In one embodiment, allocate module 1282 may allocate resources of processor 500 or other resources, such as registers or buffers, to execute a given instruction. Allocate module 1282 may make allocations in schedulers, such as a memory scheduler, fast scheduler, or floating point scheduler. Such schedulers may be represented in FIG. 5B by resource schedulers 584. Allocate module 1282 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
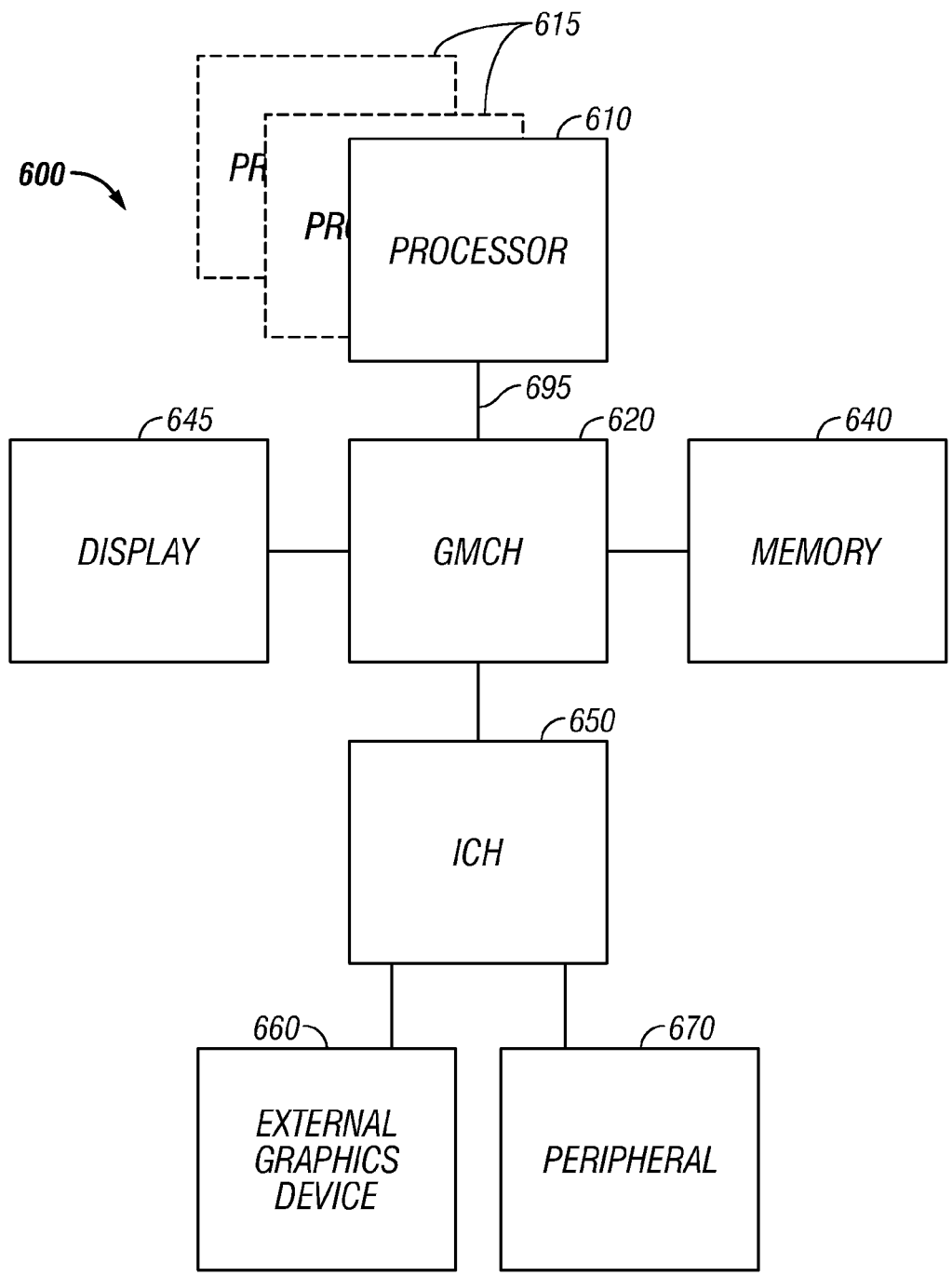
FIG. 6 is a block diagram of a system, in accordance with embodiments of the present disclosure.
Figure 7:
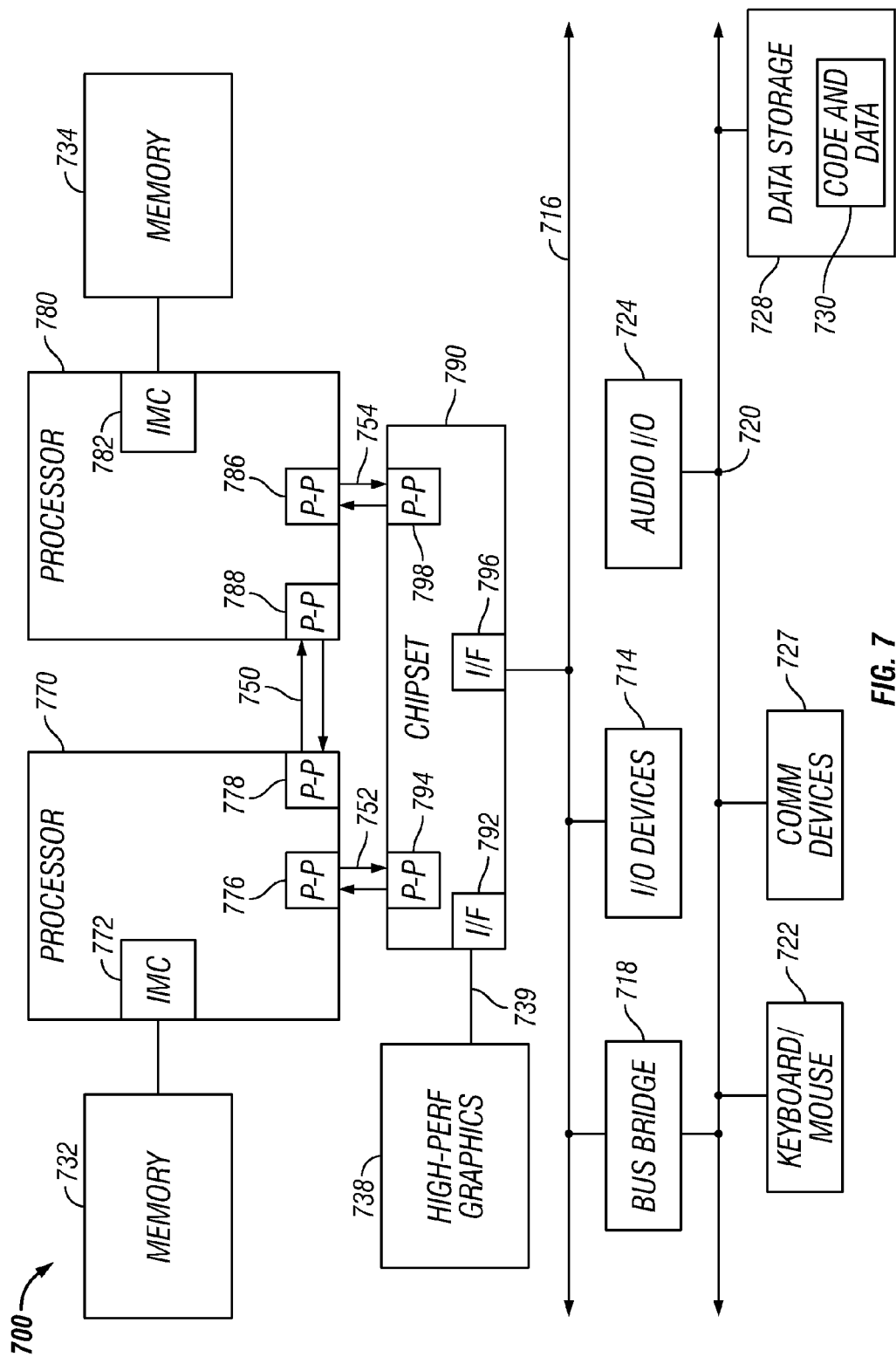
FIG. 7 is a block diagram of a second system, in accordance with embodiments of the present disclosure.
Figure 8:
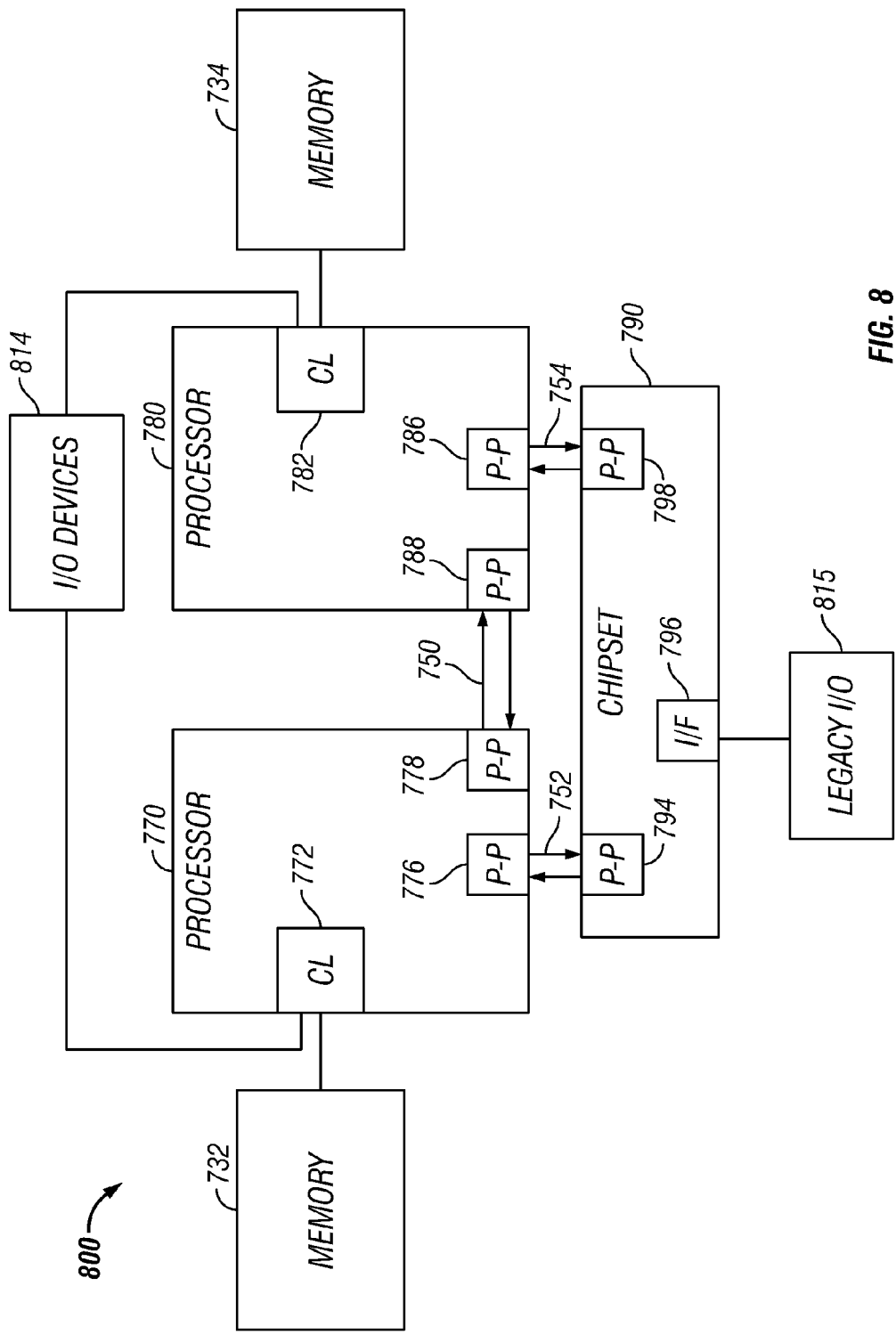
FIG. 8 is a block diagram of a third system in accordance with embodiments of the present disclosure.
Figure 9:
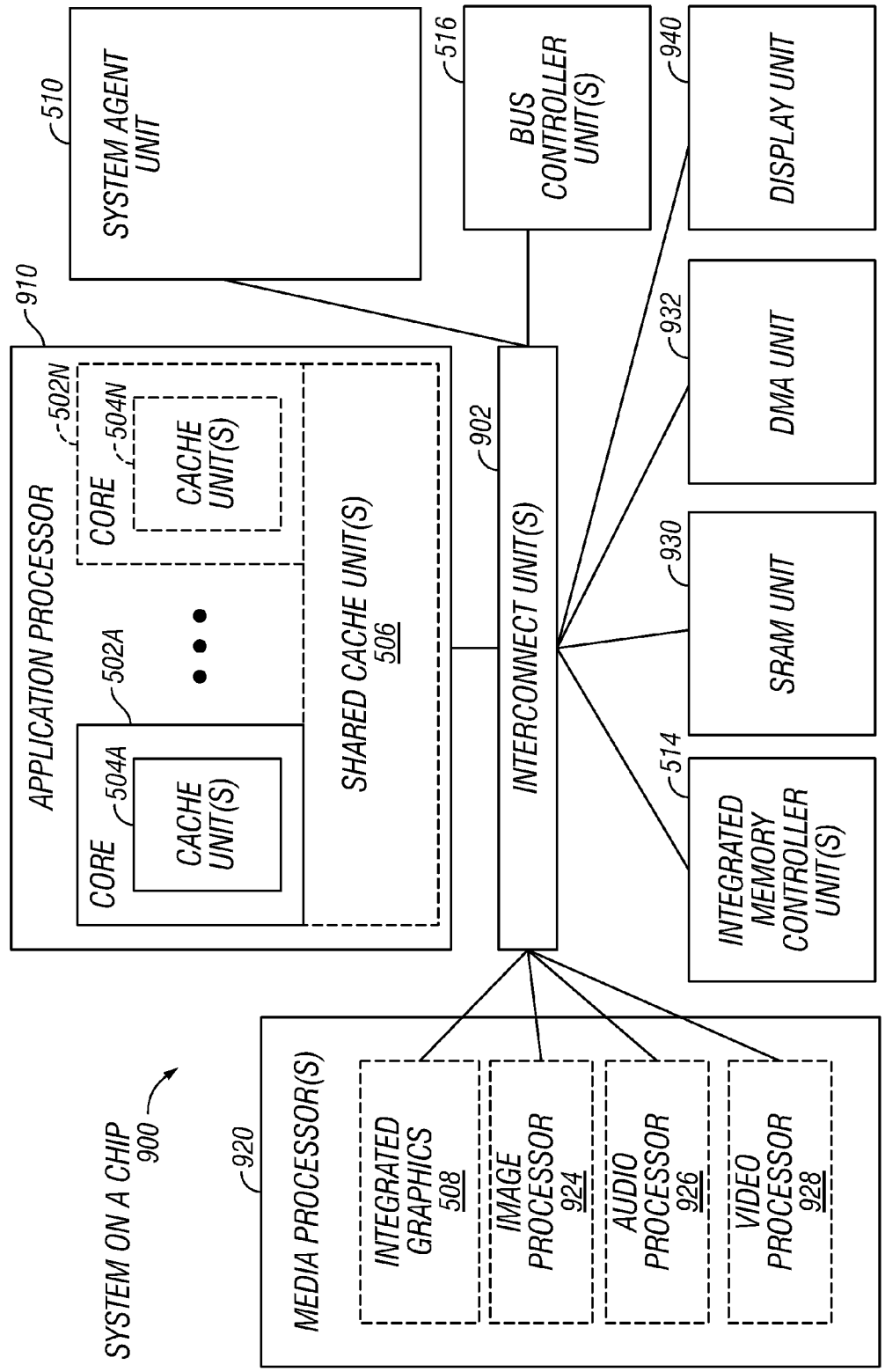
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610, 615 may be some version of processor 500. However, it should be noted that integrated graphics logic and integrated memory control units might not exist in processors 610, 615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include be a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610, 615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 870, 880 may include integrated memory and I/O control logic ("CL") 872 and 882, respectively. For at least one embodiment, CL 872, 882 may include integrated memory controller units such as that described above in connection with FIGS. 5 and 7. In addition, CL 872, 882 may also include I/O control logic. FIG. 8 illustrates that not only memories 832, 834 may be coupled to CL 872, 882, but also that I/O devices 814 may also be coupled to control logic 872, 882. Legacy I/O devices 815 may be coupled to chipset 890.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 902A-N and shared cache units 906; a system agent unit 910; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
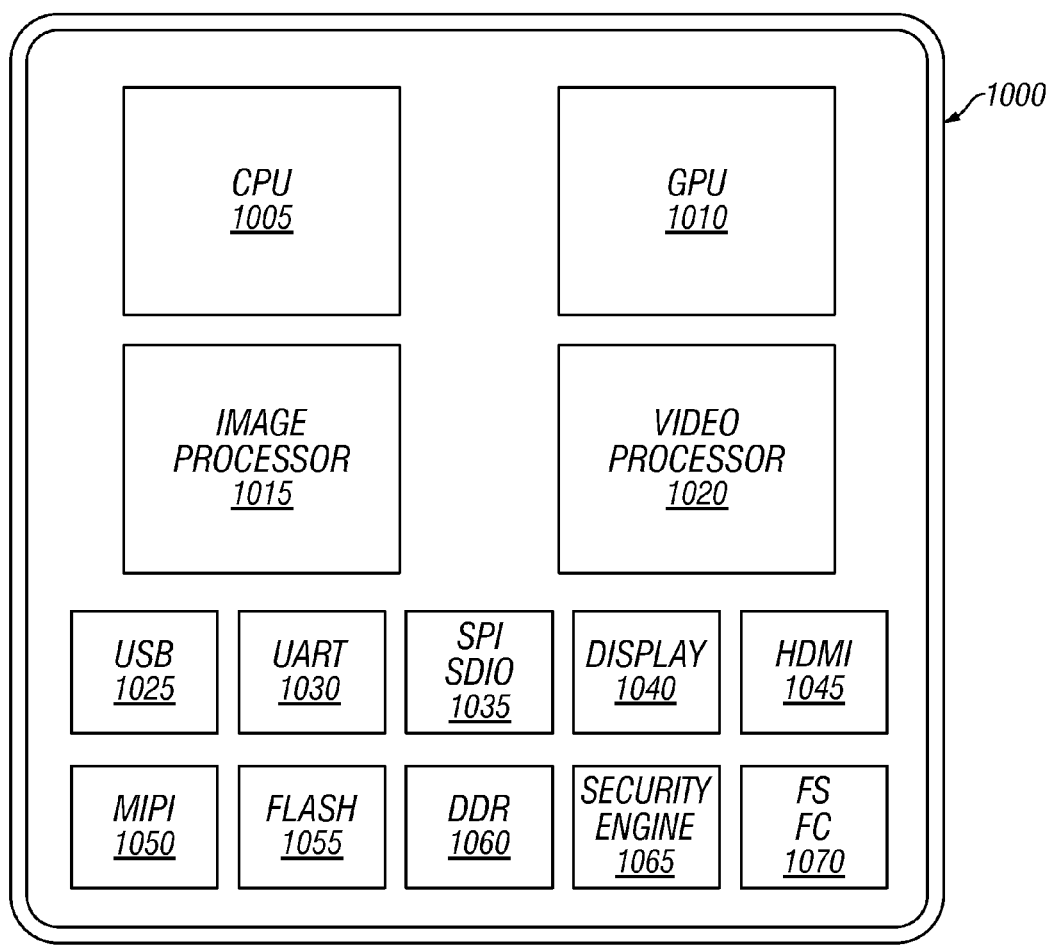
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and I$^2$S/I$^2$C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
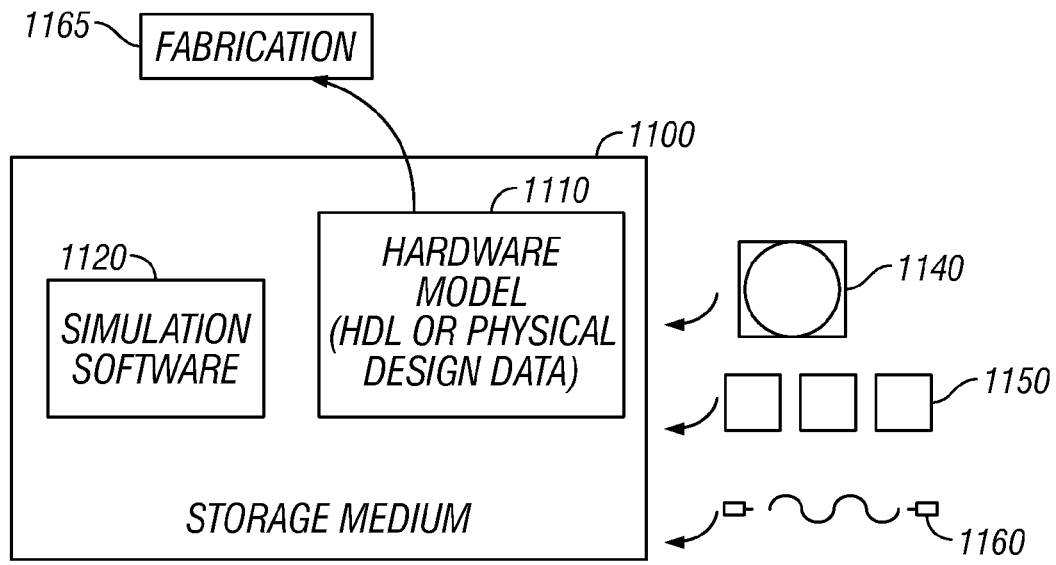
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1130 may include simulation software 1120 and/or hardware or software model 1110. In one embodiment, the data representing the IP core design may be provided to storage 1130 via memory 1140 (e.g., hard disk), wired connection (e.g., internet) 1150 or wireless connection 1160. The IP core information generated by the simulation tool and model may then be transmitted to a fabrication facility where it may be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
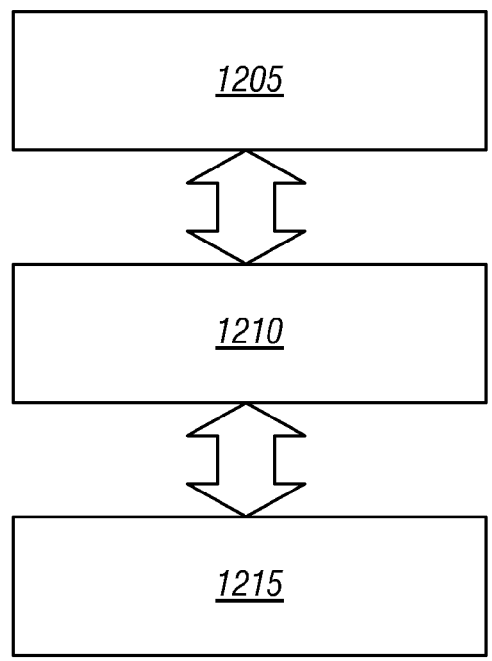
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
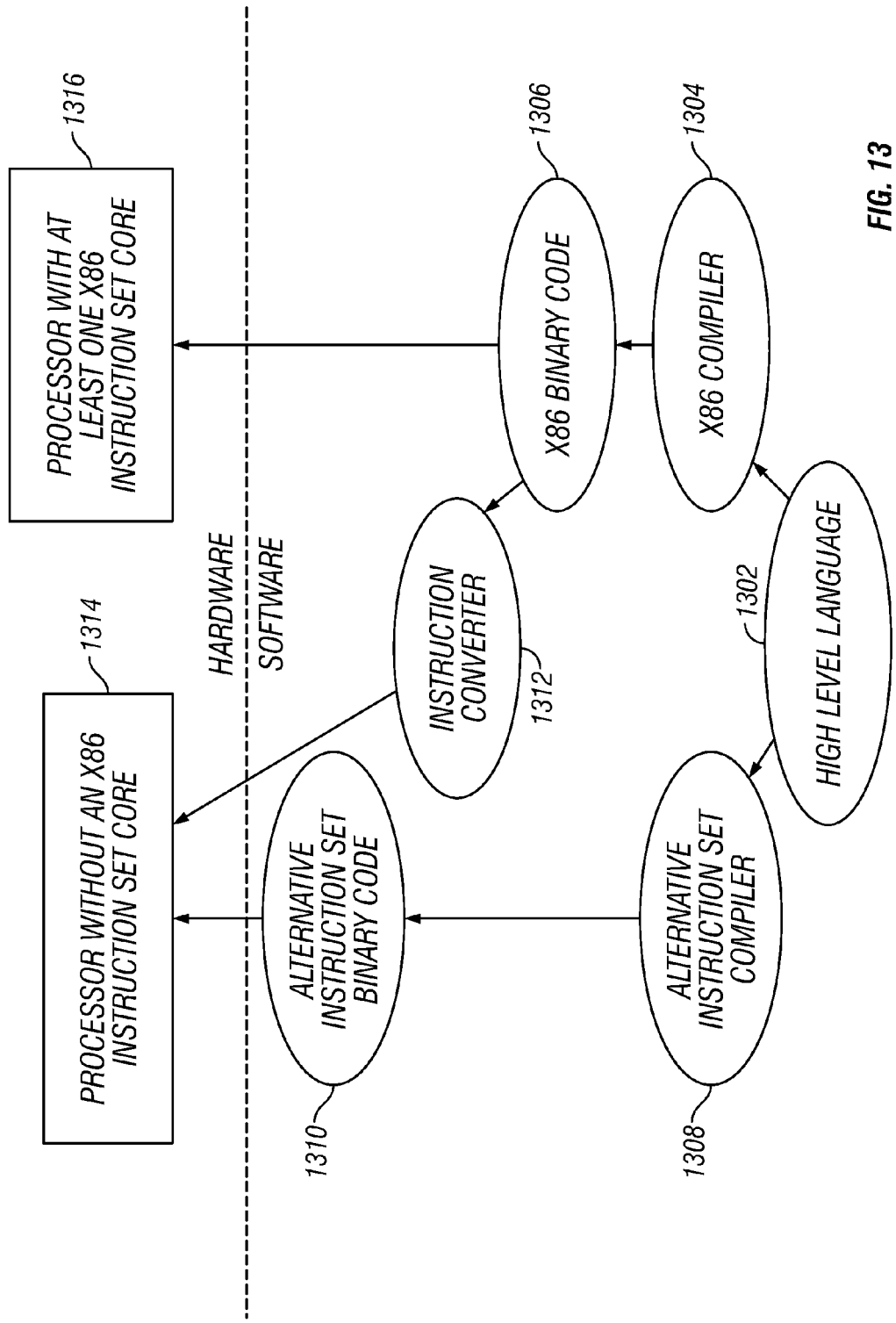
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
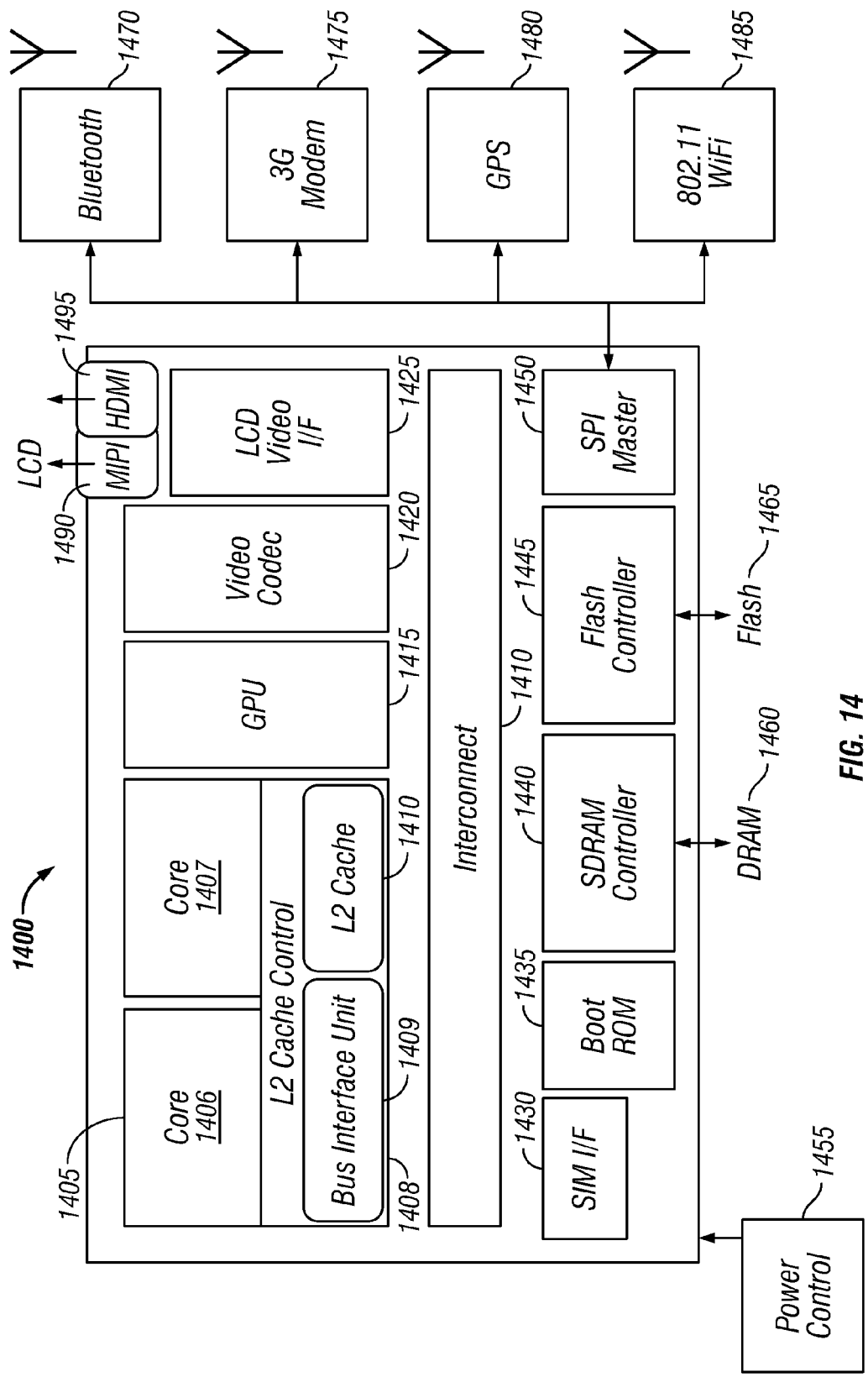
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1410. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module. Flash controller 1445 may provide access to or from memory such as flash memory or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
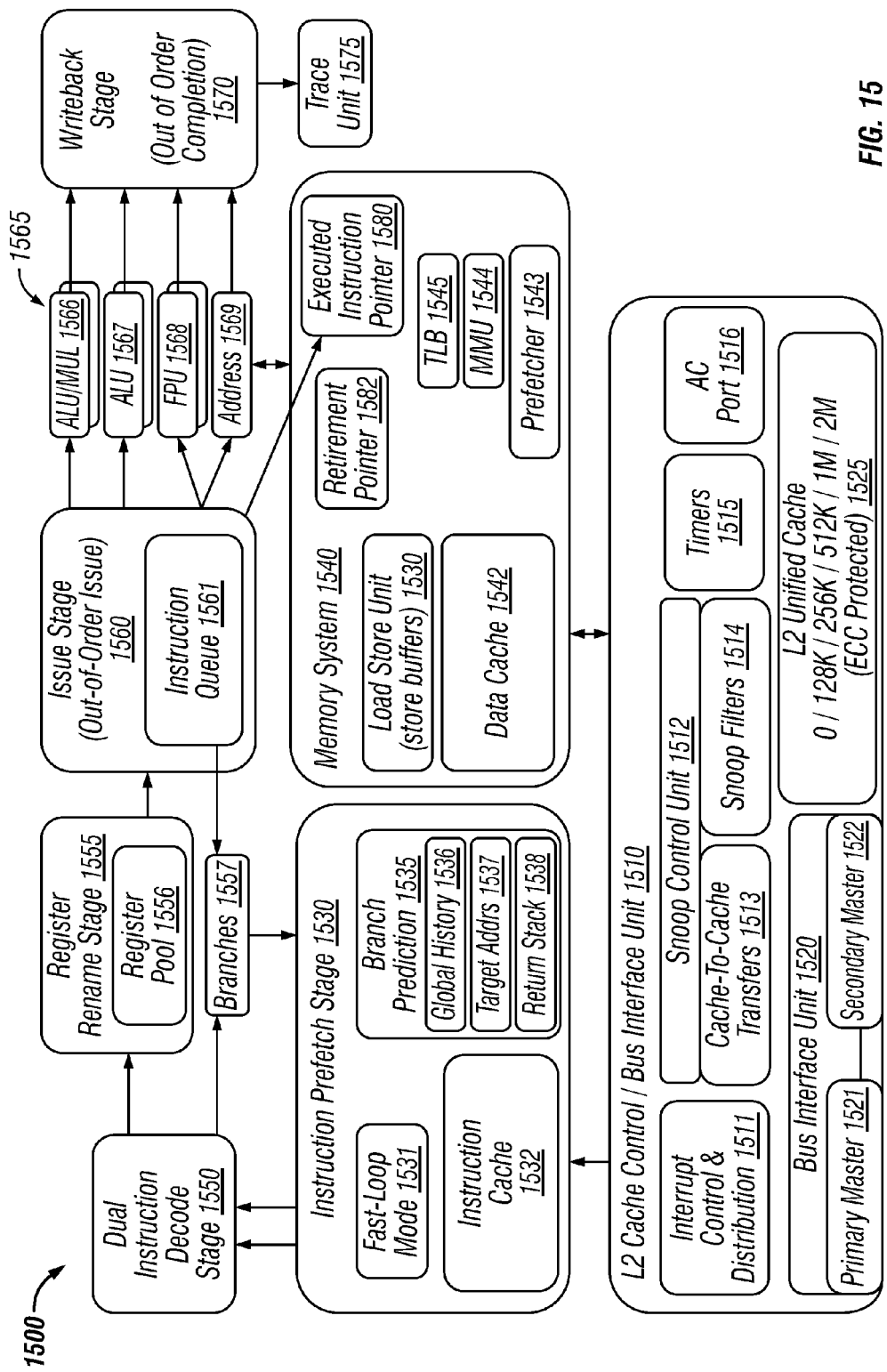
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1564 may be performed by one or more stages of execution. Such stages may include, for example, instruction prefetch stage 1530, dual instruction decode stage 1550, register rename stage 155, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2 M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1504 may include a load store unit 1530 for storing information such as buffers written to or read back from memory or registers. In another embodiment, memory system 1504 may include a translation lookaside buffer (TLB) 1545 that provides look-up of address values between physical and virtual addresses. In yet another embodiment, bus interface unit 1520 may include a memory management unit (MMU) 1544 for facilitating access to virtual memory. In still yet another embodiment, memory system 1504 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
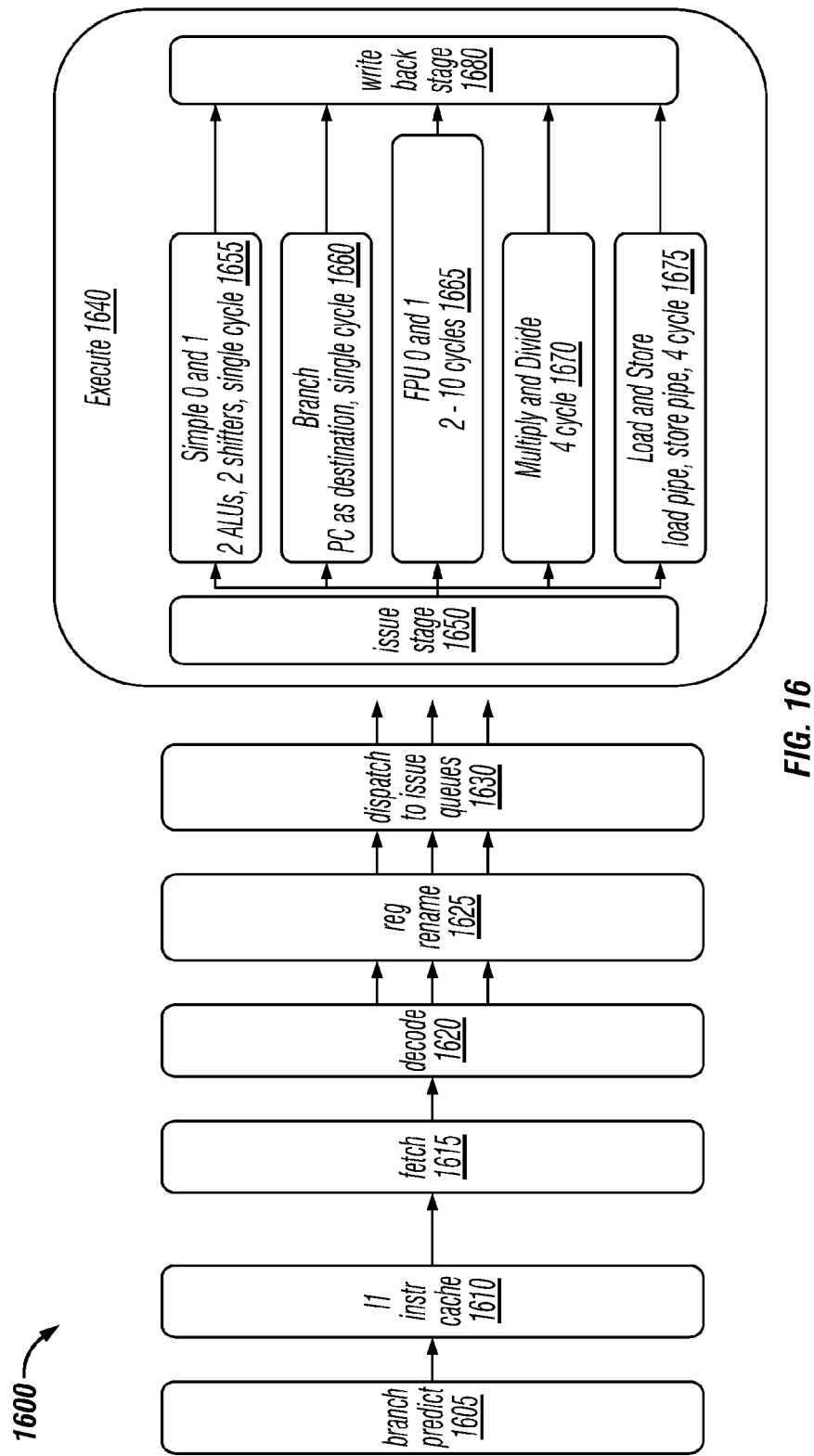
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
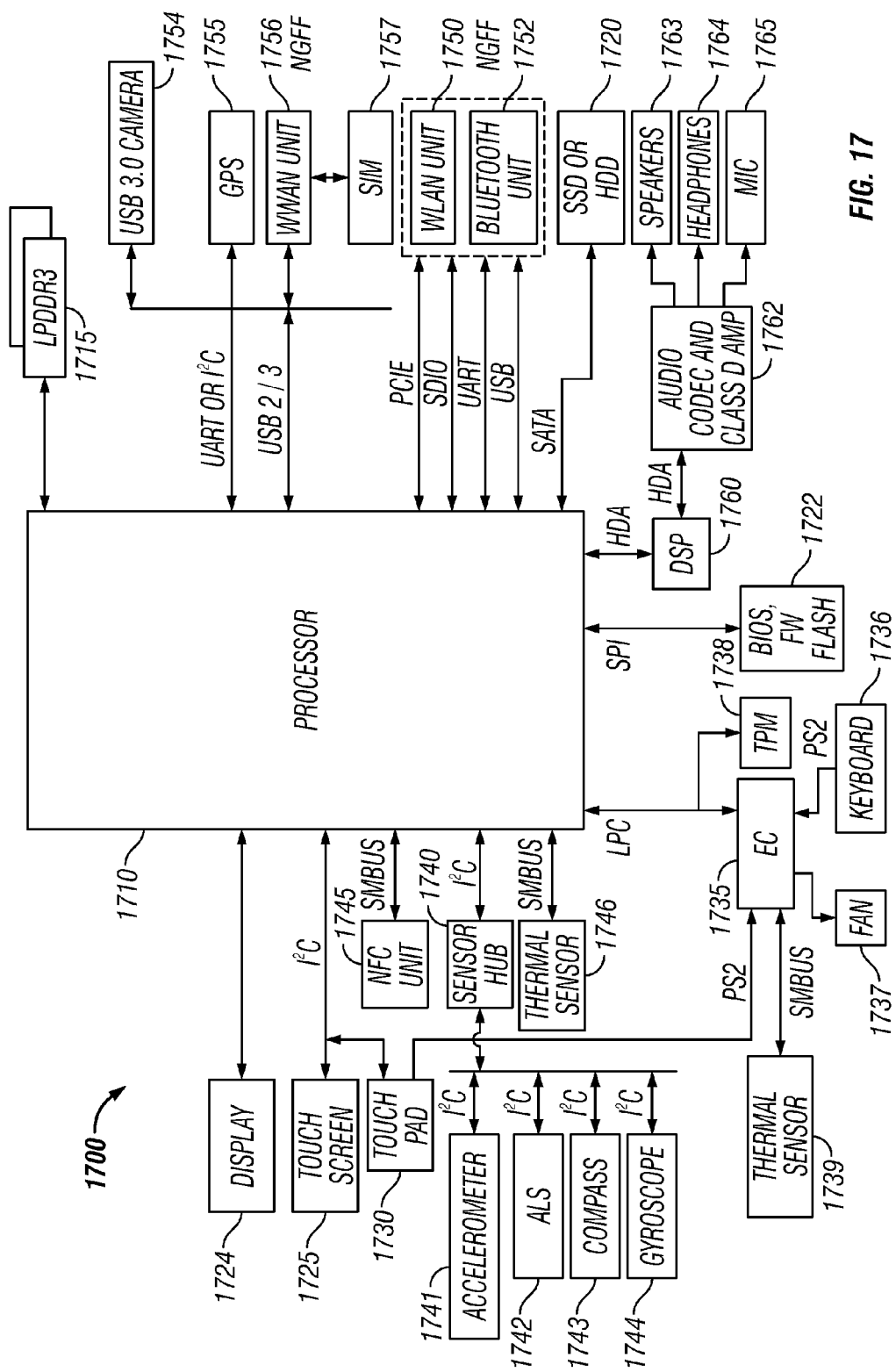
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I²C bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS), a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1746, and touch pad 1730 may be communicatively coupled to EC 1735. Speaker 1763, headphones 1764, and a microphone 1765 may be communicatively coupled to an audio unit 1764, which may in turn be communicatively coupled to DSP 1760. Audio unit 1764 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
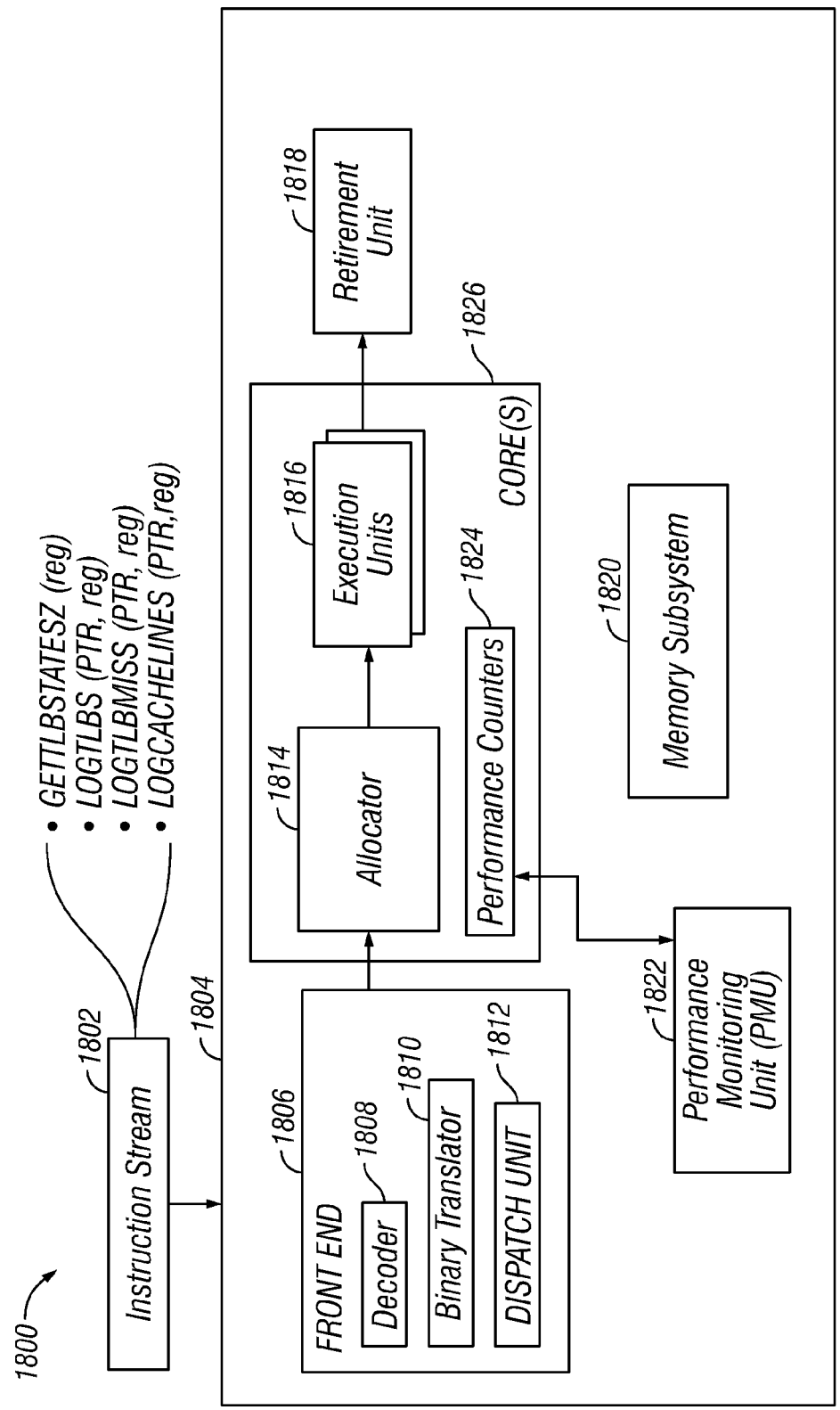
FIG. 18 is an illustration of an example system for an instruction and logic for characterization of data accesses, according to embodiments of the present disclosure.

FIG. 18 is an illustration of an example system 1800 for an instruction and logic for characterization of data accesses, according to embodiments of the present disclosure.

Users and developers of software may sometimes encounter problems in the execution of software and made need to characterize events occurring at the processor level. However, the frequency of the events one would like to profile when analyzing data accesses may be inversely proportional to the amount of time that is profiled—otherwise, the storage, processing, or bandwidth requirements may be excessively large. Thus, while it is theoretically possible to figure out what is happening through a complete trace of every address for every load and store in a program, the amount of information that would be required is so large that this is not feasible in practice. Furthermore, many techniques for collecting information are intrusive. System 1800 may enable a performance analysis methodology of progressively zooming in on information. Users and developers of software may issue instructions for system 1800 to execute to characterize data accesses by other instructions, wherein the system 1800 records only precisely information that a programmer may require at a given step of her analysis. In one embodiment, system 1800 may include separate mechanisms to provide characterization of data accesses at different levels or viewpoints. The mechanism may be used in sequential combination such that a problem may be specifically identified.

In various embodiments, system 1800 may include multiple mechanisms that may be used to characterize data access. These mechanisms may be used in tandem with each other. For example, one mechanism may be used based upon the results of a previously used mechanism. Any suitable number and kind of mechanisms may be used. The mechanisms may include varying degrees of granularity of characterization of data accesses. In some embodiments, the different mechanisms may be characterized as more or less coarse or fine in terms of the granularity of characterization of data accesses. The granularity may be evaluated with respect to the scope of the data access that is being characterized.

In one embodiment, system 1800 may include a mechanism that may obtain a snapshot of a translation lookaside buffer (TLB), including a data TLB (dTLB). In a further embodiment, the snapshot may be used to determine which memory pages have been touched by hardware. The snapshot may be used periodically and thus cause a relatively low overhead. Embodiments of such a mechanism are illustrated in more detail in FIG. 19 and are discussed below.

In another embodiment, system 1800 may include a mechanism to dump a trace of all addresses that have triggered TLB misses. In a further embodiment, the dump may illustrate how much pages have been accessed. Furthermore, the dump may illustrate the degree to which accesses are bursting to pages. When used on a modest portion of execution, such as several seconds to a few minutes, such a dump may be adequate for informational purposes as well as an efficient use of computing resources. Embodiments of such a mechanism are illustrated in more detail in FIG. 20 and are discussed below.

In yet another embodiment, system 1800 may include a mechanism to dump a trace of all addresses that trigger cache misses. In a further embodiment, the trace of addresses may be from a predetermined or designated set of pages. By using such a dump on a very small portion of execution, fine-grained access may be yielded about cache-lines. Embodiments of such a mechanism are illustrated in more detail in FIG. 21 and are discussed below.

System 1800 may collect profiling information about data accessed by an application without interfering with that application. Furthermore, system 1800 may collect the information without reducing the scale and configuration in which the application runs, which is required for tracing in other systems. Performance counters may be used in tracing. However, other systems' use of performance counters does not obtain both a complete and accurate set of the information provided by system 1800. Furthermore, with a performance management unit (PMU), theoretically one can trigger an interrupt every time an event of interest is encountered to obtain accurate information; however, interference with an executing application may be extreme. Furthermore, if one uses sampling, wherein an interrupt is triggered every N events to limit interference, significant information may be lost.

In order to collect and characterize data accesses, hardware support in system 1800 may be used. Tracing of page accesses at a software level alone may be too expensive to be practical. Such a technique might require setting up protections and protection faults to log accesses. Such software methods might yield very long range average behaviors (roughly capturing one access out of millions or billions for profiling), and therefore, while they may pinpoint some data accesses, the results might not reveal much about phase-sensitive behaviors or finer grained distinctions.

In contrast, system 1800 may bypass the need for hardware to collect enormous amount of data, analyze it, and perform complex filtering. In one embodiment, users of system 1800 may utilize instructions to progressively zoom in data access information at different levels of detail using different instructions. At each such level, software—by issuing different instructions—may direct hardware to collect different telemetry that can be used to piece together a more complete analysis of problematic code.

In one embodiment, system 1800 may use coarse-grained footprint assessment to find a dynamic page footprint of execution. In another embodiment, system 1800 may use medium-grained discrimination between pages by collecting short, approximate page access traces a thread at a time. Such collections may be made in intervals less than a millisecond. Using these trace bursts, software may be able to distinguish between short and long-term reuse. In yet another embodiment, system 1800 may use fine-grained cache-block access traces. In such an embodiment, hardware may capture approximate sequences of cacheline misses in a dense form. Such data may be processed to yield an illustration of how accesses are clumped together. Using these embodiments, software may be used to maintain reuse or touch information over large times or different addresses, while hardware may be used to collect well-defined events over very short durations. The hardware may make such collections without having to generate interrupts, handles exceptions, or track and tag instructions through different parts of the execution pipeline as part of code profiling. While these steps may be taken in addition to the embodiments of system 1800, they are not essential for its operation.

In various embodiments, different instructions may be used in combination with one another to address different granularities of data access characterization. For example, software might issue an instruction to hardware to collect coarse-grained footprints for a short while, such as from several seconds to a few minutes. The results may be used by software to determine what medium-grained information to be obtained. Such information may be obtained by issuing another instruction. These results may in turn be used to determine what fine-grained information to obtain. The different instructions may be used iteratively, overlapping with each other, or non-sequentially. The use of hardware is limited and so the demands on processing resources and caches may remain small and unaffected by the stage of processing and the duration of collection.

System 1800 may include a processor, SoC, integrated circuit, or other mechanism for characterization of data accesses. For example, system 1800 may include processor 1804. Although processor 1804 is shown and described as an example in FIG. 18, any suitable mechanism may be used. Processor 1804 may include any suitable mechanisms for executing and implementing instructions and logic for characterization of data accesses. Processor 1802 may be implemented fully or in part by the elements described in FIGS. 1-17.

Instructions for characterization of data accesses to be executed on processor 1804 may be included in instruction stream 1802. Instruction stream 1802 may be generated by a compiler, which may or may not be included in system 1800. The compiler may take application code and generate executable code in the form of instruction stream 1802. Instruction stream 1802 may include instructions that are to be executed by processor 1804 to characterize data access and may be loaded to processor 1804 in any suitable manner. For example, instructions to be executed by processor 1804 may be loaded from storage, from other machines, or from other memory. The instructions may arrive and be available in resident memory, such as RAM, wherein instructions are fetched from storage to be executed by processor 1804. The instructions may be fetched from resident memory by, for example, a prefetcher or fetch unit (not shown). Moreover, instruction stream 1802 may include other instructions for which execution will be characterized by the instructions for characterization of data accesses.

Processor 1802 may include a front end 1806 to receive the instructions as they are loaded from, for example, memory. Decoder 1808 may decode the instructions which may be placed into cache or other local memory of processor 1802, such as an instruction cache. Front end 1806 may include a binary translator 1810 to optimize, amend, or otherwise change code to be executed. In one embodiment, instructions for characterization of data accesses may be inserted into instruction stream 1802 may binary translator 1810. Binary translator 1810 may include, for example, a compiler, just-in-time interpreter, or other suitable mechanism. Front end 1806 may include a dispatch unit 1812 to send instructions to cores 1826 or execution units 1816 for execution.

Processor 1802 may include one or more cores 1826 to accept and execute instructions. Resources for executing the instructions may be assigned or allocated by allocator 1814. The instructions may be executed by one or more execution units 1816. During execution, access to data or additional instructions may be made through memory subsystem 1820. Moreover, results from execution may be stored in memory subsystem 1820. Memory subsystem may include, for example, memory, RAM, or a cache hierarchy.

Any suitable instructions may be used to perform characterization of data accesses. The following instructions are presented as examples. In various embodiments, more or less instructions might be used.

In one embodiment, the instructions for characterization of data access may include an instruction to determine the size of TLB in system 1800. The size might be used to actually poll the TLB. In a further embodiment, the instructions for characterization of data access may include an instruction to identify the dynamic page footprint of application software. The dynamic footprint may be determined in relation to TLB access. The footprint may be described, for given page ranges, in qualitative or quantitative terms. For example, "hot", "cold", or "warm" may be used, wherein "hot" represents the most active page ranges in terms of TLB access. The instructions may include, for example, "GETTLBSTATESZ" and "LOGTLBS".

In another embodiment, the instructions for characterization of data access may include an instruction to approximate a page access trace collection. In a further embodiment, the instruction might yield data to distinguish between pages that are accessed many times per second from other pages. The instruction may include, for example, "LOGTLBMISS".

In yet another embodiment, the instructions for characterization of data access may include an instruction to identify a list of pages identified as including significant activity from the software that is executing. In a further embodiment, hardware may then collect more detailed information of an access trace for cacheblocks missing at a given level of a cache hierarchy. The level may include a last-level cache. The access trace may include a soft trace, wherein it provides a faithful identification of a collection of accesses that happen in a small amount of time, such as less than a millisecond. The instruction may include, for example, "LOGCACHELINES".

Software issuing the instructions may analyze the output of each and use it to create an input for the next. The instructions may be used in pipelined fashion. If a workload is steady-state or is finely reproducible, instructions might complete each part and analyze its output in an offline step before initiating the next.

The execution of the identified instructions may be handled in part by, for example, performance monitoring unit 1822 (PMU). PMU 1822 may be implemented in any suitable portion of processor 1804. PMU 1822 may be logically associated with one or more cores 1826. PMU 1822 may access performance counters 1824, located in any suitable portion of processor 1804. Moreover, PMU 1822 may access portions of memory subsystem 1820 to gather data. The operations of PMU 1822 may be performed by cores or execution units executing instructions, but may be logically associated with PMU 1822.

Figure 19:
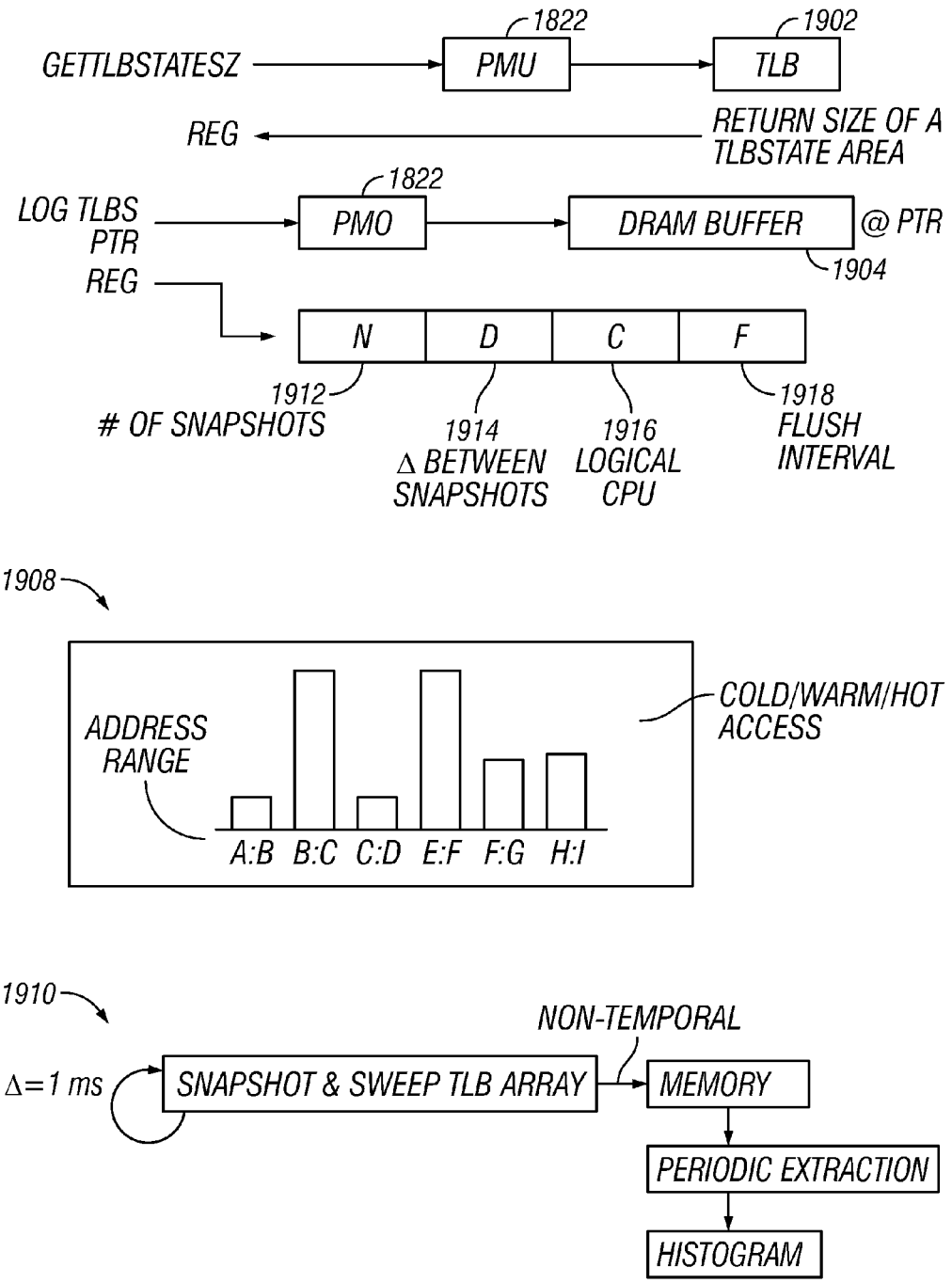
FIG. 19 is an illustration of coarse-grained characterization of data accesses, according to embodiments of the present disclosure.

FIG. 19 is an illustration of coarse-grained characterization of data accesses, according to embodiments of the present disclosure.

In one embodiment, system 1800 may execute an instruction to return the size of a TLB state area. For example, the instruction GETTLBSTATESZ may be executed. The instruction GETTLBSTATESZ may include any suitable number and kind of operands, bits, flags, parameters, or other elements. In one embodiment, a call of GETTLBSTATESZ may reference a register in which the results of the instruction will be stored. GETTLBSTATESZ may be executed, logically, by PMU 1822 and may access TLB 1902. The size of the TLB may be returned.

In one embodiment, GETTLBSTATESZ lets the caller of the instruction obtain the size of a record that is needed for capturing a snapshot of TLB state for a particular CPU implementation. In another embodiment, use of GETTLBSTATESZ may be omitted if the information is documented elsewhere, such as by querying a database for CPUID results. Once the caller of GETTLBSTATESZ obtains the size, space for the record may be allocated. A buffer in memory may be established that is large enough to contain a multiple of that size, which may be several megabytes in DRAM.

Furthermore, in one embodiment system 1800 may execute an instruction to collect one or more snapshots into the allocated DRAM buffer, or another suitable location. For example, the instruction LOGTLBS may be executed. This instruction may include any suitable number and kind of operands, bits, flags, parameters, or other elements. In a further embodiment, a call of LOGTLBS may reference a pointer. The pointer may identify where the snapshots are to be stored. In another, further embodiment, a call of LOGTLBS may reference a register with parameters or operands about the snapshots that will be made. Such a register may specify, for example, operands may include an identifier 1912 of the number of snapshots to be taken, an identifier 1914 of a time delay in between snapshots, an identifier 1916 of the logical CPU that is to be tracked, and an identifier 1918 of an interval between flushes. A call to LOGTLBS may cause PMU 1822 to calculate the data and access DRAM Buffer 1904 to write the results therein. PMU 1822 or the caller of the instruction may access the data and build a histogram 1908 of the data.

Identifier 1912 may specify the number of TLB state snapshots to collect, which may typically be a few thousand. Identifier 1914 may specify the time interval between successive snapshots, and may typically be in the range of 1 millisecond to 10 milliseconds. Thus, N×D may typically cover from several seconds to one or two minutes of data. Identifier 1916 may specify a logical CPU whose TLB state is to be recorded or, if is set to a default value (such as −1), then a logical CPU may be randomly chosen. Identifier 1918 may specify a multiple of identifier 1914 to determine a background rate at which TLBs may be flushed after taking a snapshot. Typically, such a value may be one, implying that TLBS are flushed during the process of snapshotting, once every snapshot. If identifier 1918 is zero, TLBs might not be flushed as part of this process.

The interaction between the software instructions and the hardware execution may be kept lightweight and asynchronous. In one embodiment, in order for a caller of these instructions to know the progress of logging, the pointer could point to a header byte that hardware updates upon every snapshot to indicate the number of snapshots taken. In another embodiment, in order for a caller of these instructions to know the progress of logging, a caller could pre-initialize the area pointed to by the pointer with all zero values and thus identify the approximate boundary of the last snapshot by identifying values of one.

In one embodiment, these instructions may be for a first level TLB. In another embodiment, the instructions may be extended to take a snapshot of a second level TLB. For example, the instructions could each contain a bit vector indicating which of the TLBs to record. The bit vector could be implemented, for example, as an implicit variant in instruction encoding or as an explicit argument.

Flushing may be kept within hardware execution. In one embodiment, a call to LOGTLBS may reset a previous LOGTLBS operation or call that was in progress. LOGTLBS might not save and restore states upon context switches. If the snapshot interval is small and the flush interval is one (or the same as the snapshot interval) and the targeted CPU is not varied, the LOGTLBS may provide a rough approximation to a page access trace. In such a trace, multiple accesses to the same page may be collapsed as a single access recorded in that snapshot.

In some cases, LOGTLBS may miss a page which is referenced and then evicted out of a memory management unit before the next snapshot. However, such a lack of precision, wherein not all pages are identified, may be acceptable performance. The footprint of system's page access for LOGTLBS might only need to be approximate.

LOGTLBS may stream the snapshots to DRAM buffer 1904 without polluting caches. If eight kilobytes were required for each snapshot, for an interval of one millisecond LOGTLBS may cost the system about eight megabytes per second of DRAM bandwidth. This may be negligible. If the flush interval is nonzero, TLB misses may increase. However, many of the TLBs that are flushed would be quickly reconstructed from page directory caches.

For a TLB with 128 entries, costing about forty clock cycles per TLB miss per millisecond, this would cost approximately 5000 cycles or 2.5 microseconds on a two GHz processor. This should be a negligible penalty. If TLB snapshots require eight kilobytes each and compressing is not performed, a 480 megabyte buffer could collect 60,000 snapshots. Thus, taking a snapshot each millisecond might still efficiently produce a sixty-second profile. This may be sufficiently long to draw meaningful conclusions about a program's size and distribution of accesses at a page level.

Analysis of the TLB snapshots may allow generation of a histogram such as a graph 1908 illustrating page presence in TLBs. By flushing the TLBs, the correlation between actual references and snapshots can be improved. Access profiles for different ranges of page addresses are shown in graph 1908. As discussed above, access might be qualitatively categorized into cold, warm, or hot access, wherein hot access includes the largest amount of access.

This operation is illustrated in graph 1910. In some embodiments, LOGTLBS might only grab a single snapshot of the TLB state. A caller of such an instance of LOGTLBS might need to execute the instruction periodically, such as via timer interrupt.

Figure 20:
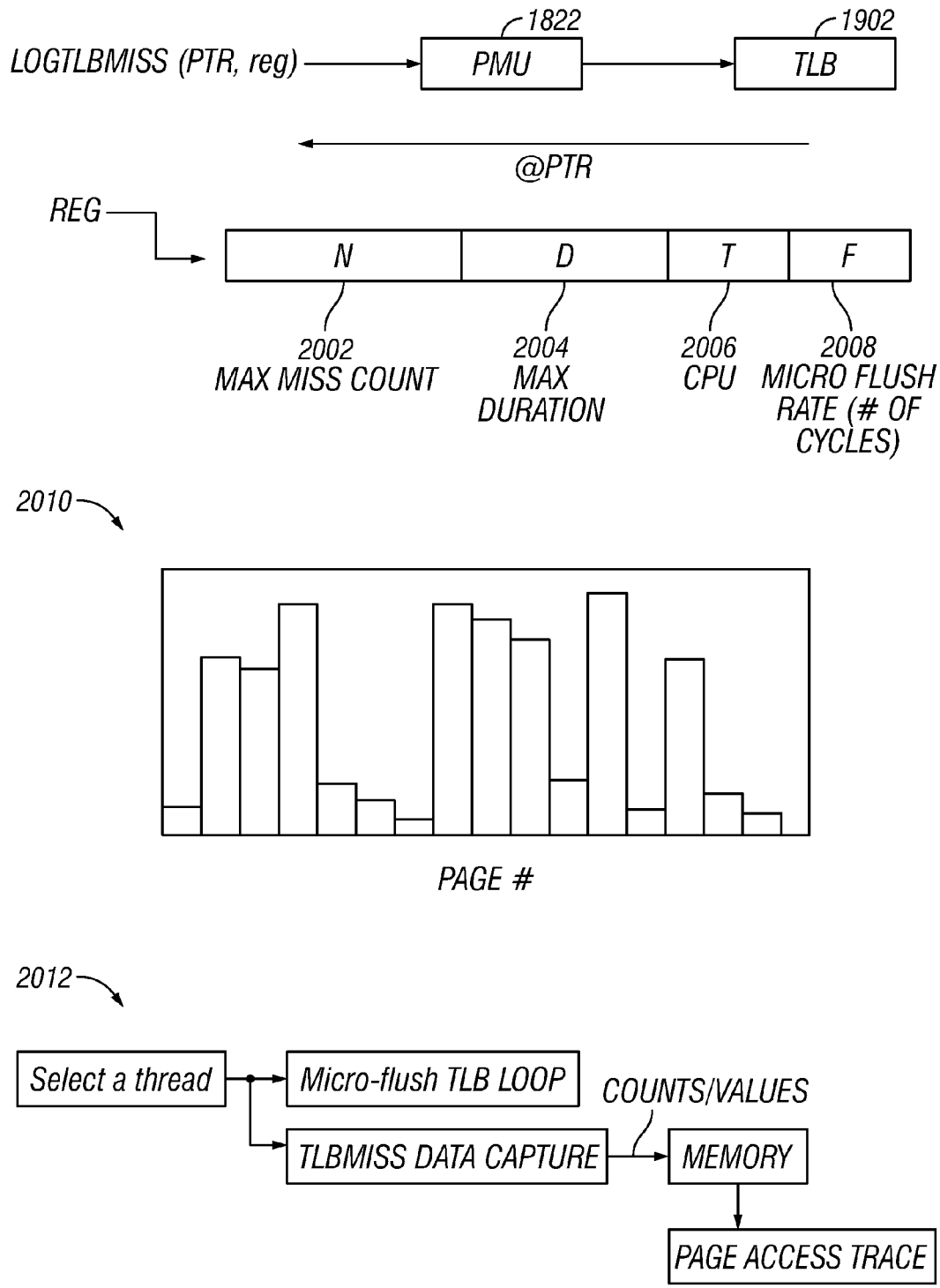
FIG. 20 is an illustration of medium-grained characterization of data accesses, according to embodiments of the present disclosure.

FIG. 20 is an illustration of medium-grained characterization of data accesses, according to embodiments of the present disclosure.

In one embodiment, system 1800 may execute an instruction to distinguish between pages that are used extensively for a short time and pages that are used over a much longer duration (such as those identified with LOGTLBS). Both types of pages may contain cachelines that need to be identified as described within the context of FIG. 21, below. While execution of LOGTLBS may capture access in the aggregate, it may miss pages that are moderately frequented but are vulnerable to eviction by more frequently referenced pages.

In a further embodiment, system 1800 may execute an instruction that sets up a buffer into which hardware will seep TLB miss events with TLB miss data. In yet another, further embodiment, such an instruction may perform such sweeping for a single thread identified in the instruction call at a time. Capture may be limited to a single thread to minimize bandwidth and CPU overhead. Furthermore, the targeted thread can be rotated over time in order to obtain a wide view data accesses from all threads. Also, the concern over bandwidth may be the basis for the instruction to capture TLB misses rather than hits. Misses are rarer and therefore may require less bandwidth. TLB misses may be captured rather than address references because it results in a reduction in data to capture of about two to four orders of magnitude, assuming that about one TLB miss exists in every 300-10,000 instructions. If collection of TLB misses is initiated after a TLB flush, then a series of such misses allow reconstruction of an approximate version of a thread's dynamic page access sequence. Such a sequence may allow software to better tune the capture of address reference such as described below in the context of FIG. 20. TLB miss rates (across a wide range of workloads, including demanding ones like TPC-C, TPC-E, and SPECjEnterprise) are generally in the range from one per 300 instructions to one per 10,000 instructions. At the very high rate of one per 300 instructions, a capture of 10 million miss events would cover a duration of about 3 billion instructions on a thread. For a clock-per-instruction rate of one, this would be a duration of 1.5 seconds. If each miss event produces, for example, sixty-four bytes of data, 640 megabytes of data streaming each 1.5 seconds (or about 0.4 GB/s) worth of bandwidth. This may be an efficient use of bandwidth.

In one embodiment, the instruction LOGTLBMISS may be executed. In a further embodiment, the instruction LOGTLBMISS may cause collection of misses after starting with a flush of a thread's TLB. In another, further embodiment, the instruction LOGTLBMISS may cause collection of misses based upon the choice of the caller of the instruction. For example, the instruction may be called with a parameter specifying that the TLB is to be flushed before capture, or that capture is to be made of short bursts without starting with an empty TLB. The instruction may cause operations to be performed by PMU 1822 upon TLB 1902.

The instruction may include any suitable number and kind of operands, bits, flags, parameters, or other elements. In one embodiment, a call of LOGTLBMISS may reference a register containing operands for its execution. For example, LOGTLBMISS may access an identifier 2002 specifying a maximum miss count, an identifier 2004 specifying a maximum duration, an identifier 2006 specifying a processor on which the thread runs, and an identifier 2008 of a microflush rate, which may be specified in cycles.

In one embodiment, LOGTLBMISS may collect L1 dTLB-miss even records. The records may be collected until N records (specified in identifier 2002) are collected or D time (specified in identifier 2004) expires. LOGTLBMISS may cause one L1 TLB to be flushed every F clock cycles as specified in identifier 2008 on a round-robin basis. Even descriptions may be returned in memory at an address indicated by a pointer.

In one embodiment, LOGTLBMISS may complete as soon as it has programmed the hardware (such as PMU 1822) to produce information as described above. Thus, the instruction may be asynchronous. If collection stops before N events are collected, the number of TLB miss events actually collected is deposited into a register accessible by PMU 1822 so that it can be retrieved by software. Thus, the caller of the instruction may continue tracing the page access behavior of a particular thread across context switches. If there is a context switch on the CPU where the TLB miss events are being collected before either D cycles expire, or N events are collected, then the collection stops automatically. As with LOGTLBS, LOGTLBMISS can also be extended to cover either of dTLB or second-level TLB miss streams.

In one embodiment, an OS can be changed to capture TLB miss events for a single thread (following that thread from CPU to CPU as it context switches) to obtain a longitudinal capture of that thread's page access behavior. Since the caller of the instruction does not itself perform the TLB miss event capture, further store datapath utilization may be required. Graph 2012 shows sample operation of the instruction, wherein the TLB is optionally flushed and data capture is performed for a thread. The process may be repeated across multiple CPUs and the resultant data used to build a page access trace.

As shown in graph 2012, counts and actual miss-events may be collected. If only which addresses are missed and how frequently they are missed needs to be counted, instead of logging the same address multiple times a hash-count tree may be used.

Graph 2010 shows an example histogram of how much different parts of an address space are used. The granularity of graph 2010 may be a page of memory. Thus, graph 2010 provides finer granularity than the range of pages shown in FIG. 19.

Figure 21:
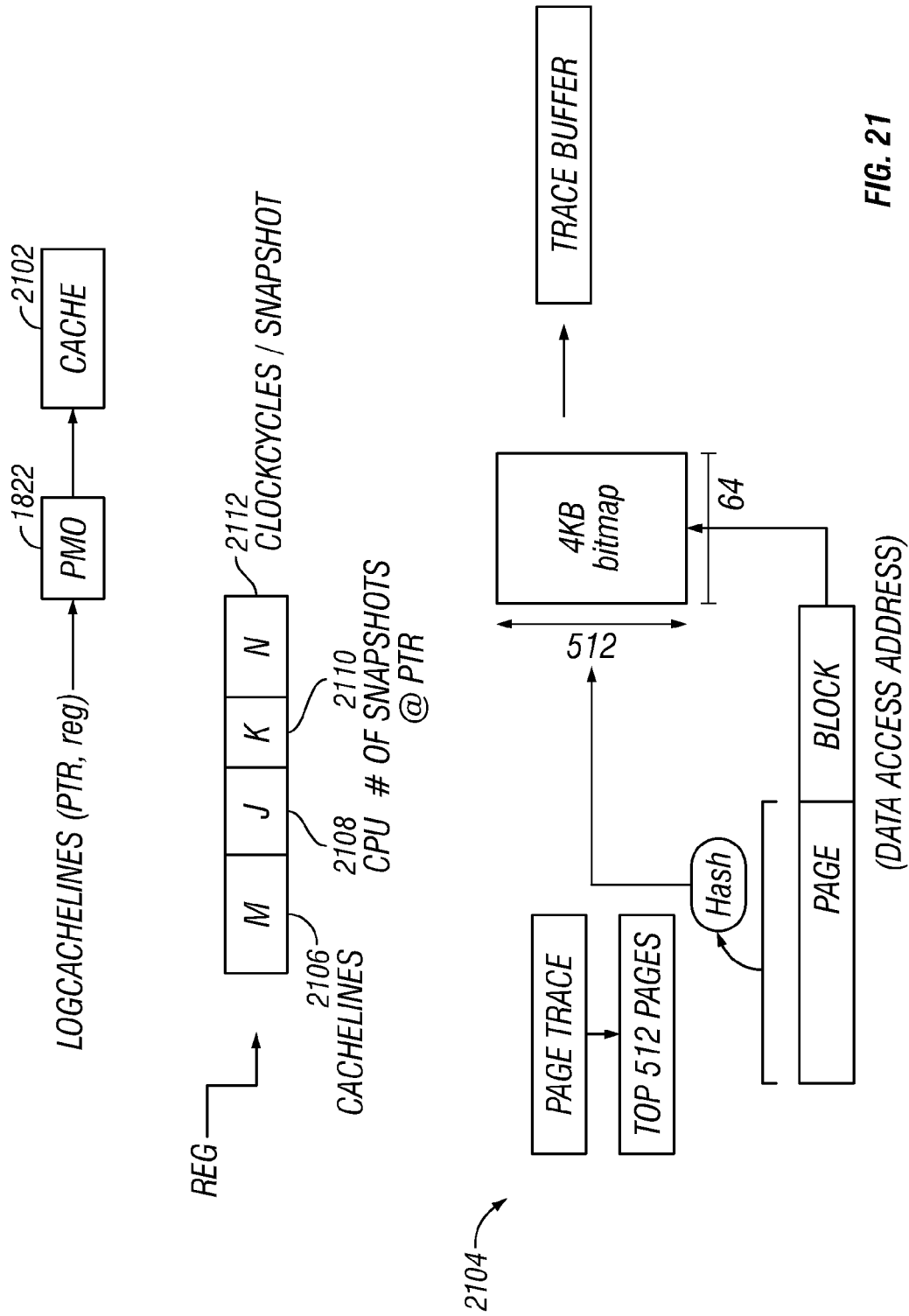
FIG. 21 is an illustration of fine-grained characterization of data accesses, according to embodiments of the present disclosure.

FIG. 21 is an illustration of fine-grained characterization of data accesses, according to embodiments of the present disclosure; and In one embodiment, system 1800 may execute an instruction to provide more detailed telemetry at a cache-line level. In a further embodiment, system 1800 may execute such an instruction across relatively more used sections of page access profiles. These sections may be determined by, for example, the instructions shown in FIGS. 19 and 20.

For example, from the results of executing the instructions of FIG. 20, a caller of the instructions may extract a list L of the most critical pages. L may contain, for example, 512 of the most critical pages. Given each page in L, software may call a function to have hardware map the page to an index in a 512 element array very efficiently. For each logical page X in the list L, let P be the physical page frame. A hash function H (P) may be, for example, $((P_{37})$ & 0x1F)|$((P_{1031})$ & 0x1E0)), where $P_M$ may be P modulo M. The hash function may extract atonal of nine non-zero bits by remaindering P against two prime numbers and selecting the lower five and upper four bits respectively from the remainder functions. While this is just an example hash function, any other suitable hash function implementation may be used. The hash function may need to be sufficiently distributive so that the likelihood of a collision wherein two different addresses in L mapping to the same index is very small. If there is such a collision, an inaccuracy may result wherein cacheblocks from two pages may map into the same index. This may have a result of counting in profiling as aliases of one another, artificially making some cachelines appear as referenced in profiles from the result of the instructions. Callers of the function may be allowed to choose the prime numbers of the hash function.

In one embodiment, the instruction to implement logging of cache lines may be LOGCACHELINES. The instruction LOGCACHELINES may include any suitable number and kind of operands, bits, flags, parameters, or other elements. In another embodiment, a call of LOGCACHELINES may reference a register in which the results of the instruction will be stored. LOGCACHELINES may be executed, logically, by PMU 1822 and may access cache 2102. In yet another embodiment, LOGCACHELINES may reference a pointer. The pointer may identify an area of physical memory that may be pinned for results. The area may constitute a collection buffer.

The register for the operands may include an identifier 2106 to describe which cachelines to capture, an identifier 2108 to specify which processor on which access bits are collected, an identifier 2110 which may specify a number K of snapshots to collect in the area defined by the pointer, and an identifier 2112 to specify a number N of clock cycles over which to collect each snapshot.

On each memory access to a cache block C, PMU 1822 may use a hash function on the high order, page frame bits to map C to a bit quadword (one of the 64 bits) in a 512 entry bitmap. For example, PMU 1822 may map C into a bit in a four kilobyte page acting as a bitmap, as shown as in graph 2104. A four kilobyte page may contain 64 cache lines, so that a single quadword has one bit per cache line in a page. When a load or store is performed, the operation may set the bit or bits corresponding to the cache line (or lines) accessed. After every N clock cycles, the four kilobyte snapshot may dumped into the buffer. Tracking may move forward in the buffer for the next dump, stopping once K snapshots have been collected. A caller of the function may preinitialize the collection buffer with zeroes to detect the amount of profile data collected.

Accordingly, over a timeframe of a few tens of microseconds on a given processor, the page bitmap can capture nearly 32,000 cachelines. These are likely to be sparsely distributed over 512 pages that are touched one or more times. If, for example, this bitmap is emptied into a trace buffer 100,000 times per second (once every 10 microseconds), system 1800 can collect a fine-grained, trace-like capture of cacheline access at a bandwidth cost of just 400 MB/s. Furthermore, the bitmap may be compressible.

This instruction may detect all loads and stores (by way of the cachelines) rather than only ones to specifically identified pages. A small amount of imprecision may be allowed during execution of this instruction, in order to moderate the amount of overhead used. In one embodiment, a data operand's page address bits will not be compared against the set of page addresses out accesses to the comparatively "cold" pages. This inaccuracy could be mitigated by using a small Bloom filter within that is created from an identification of the 512 most common pages at the start of the telemetry. The Bloom filter would be used to filter out attempted cache accesses from other pages. The number of filtered cache accesses might still be relatively rare false positives. The filter could be implemented in hardware or called by functions available to software.

In one embodiment, as cacheline-sized chunks are streamed out of the bitmap and into a trace buffer, the chunks may be reset to zero in the bitmap. Thus, the operation shown in graph 2104 may approximate a round robin access-bit scanner across cachelines in a selected, sparse set of the top 512 pages. If greater space were granted to the bitmap and if the rate of emptying the bitmap into the trace buffer were varied, more data may be available for sparser cacheline access distributions. With the results of the trace buffer, the issuer of the instruction may distinguish between cachelines whose popularity spans multiple data grabs and cachelines that are referenced intermittently across many data grabs. Thus, the issuer of the instruction may identify which cachelines, by being popular, is the source of potential problems. This type of mixed profiling may be significantly different from methods that sample after values are already created, based on interrupts, and spaced-out between many cache misses wherein hundreds of millions of cachelines may be referenced between two successive samples.

Figure 22:
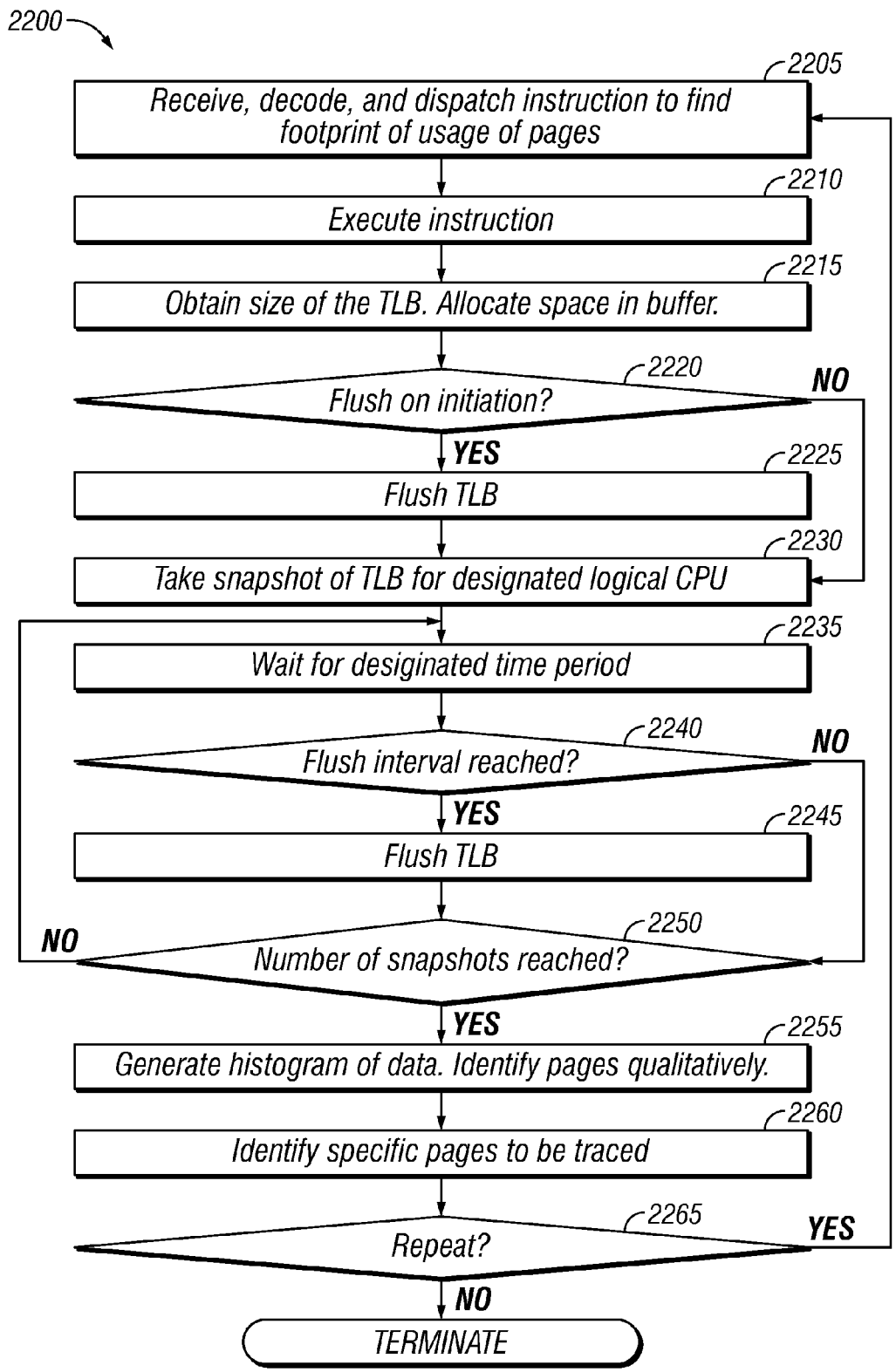
FIG. 22 is an illustration of a method for characterization of data accesses, according to embodiments of the present disclosure

FIG. 22 is an illustration of a method 2200 for characterization of data accesses, according to embodiments of the present disclosure. Method 2200 may be implemented by any of the elements shown in FIGS. 1-21. Method 2200 may be initiated by any suitable criteria and may initiate operation at any suitable point. In one embodiment, method 2200 may initiate operation at 2205. Method 2200 may include greater or fewer steps than those illustrated. Moreover, method 2200 may execute its steps in an order different than those illustrated below. Method 2200 may terminate at any suitable step. Moreover, method 2200 may repeat operation at any suitable step.

Furthermore, method 2200 may be executed multiple times to characterize footprints of usage of different pages. Method 2200 may be executed over time to characterize execution of a processor over time. Based upon the results of method 2200, other methods may be invoked, such as methods 2300, 2400, described below. These additional methods may be invoked to further explore information discovered during the execution of method 2200.

At 2205, in one embodiment an instruction to find a footprint of usage of pages may be received. The instruction may be implemented by, for example, identifying TLB usage. The instruction may be decoded and dispatched to execution units or cores. At 2210, the instruction may be executed. One or more instructions may be received and executed. For example, an instruction to determine TLB size may be executed, followed by the received instruction to find the footprint. At 2215, in another embodiment the size of the TLB may be found by executing an instruction, looking up the values in system configuration, or another suitable mechanism. Space for the TLB, or multiples thereof, may be allocated in memory to store results of method 2300. The space may be reserved as a buffer.

Steps 2220 through 2250 may be executed in hardware as part of executing the received instruction.

In one embodiment, at 2220 it may be determined whether the TLB should be flushed upon initiation of the instruction's execution. If so, method 2200 may proceed to 2225. Otherwise, method 2200 may proceed to 2230. At 2225, the TLB may be flushed.

At 2230, in one embodiment a snapshot of the TLB may be taken. The values may be recorded. The TLB may be designated according to the logical CPU. At 2235, in another embodiment execution may wait for a designated period of time before taking another snapshot. At 2240, in yet another embodiment it may be determined whether a flush interval has been reached. If so, at 2245 the TLB may be flushed.

At 2250, it may be determined whether a specified number of snapshots have been reached. If not, method 2200 may repeat at 2235. If so, at 2255 data from the snapshots may be analyzed. For example, a summary, histogram, or graph may be generated. The activity of different pages in memory, as evidenced by TLB access, may be qualitatively categorized. At 2260, in one embodiment specific pages that have significantly higher amounts of activity may be identified for further analysis. These pages may be traced using, for example, methods 2300 or 2400. These methods may be performed.

At 2265, it may be determined whether method 2200 should repeat or terminate. The instruction may be retired.

Figure 23:
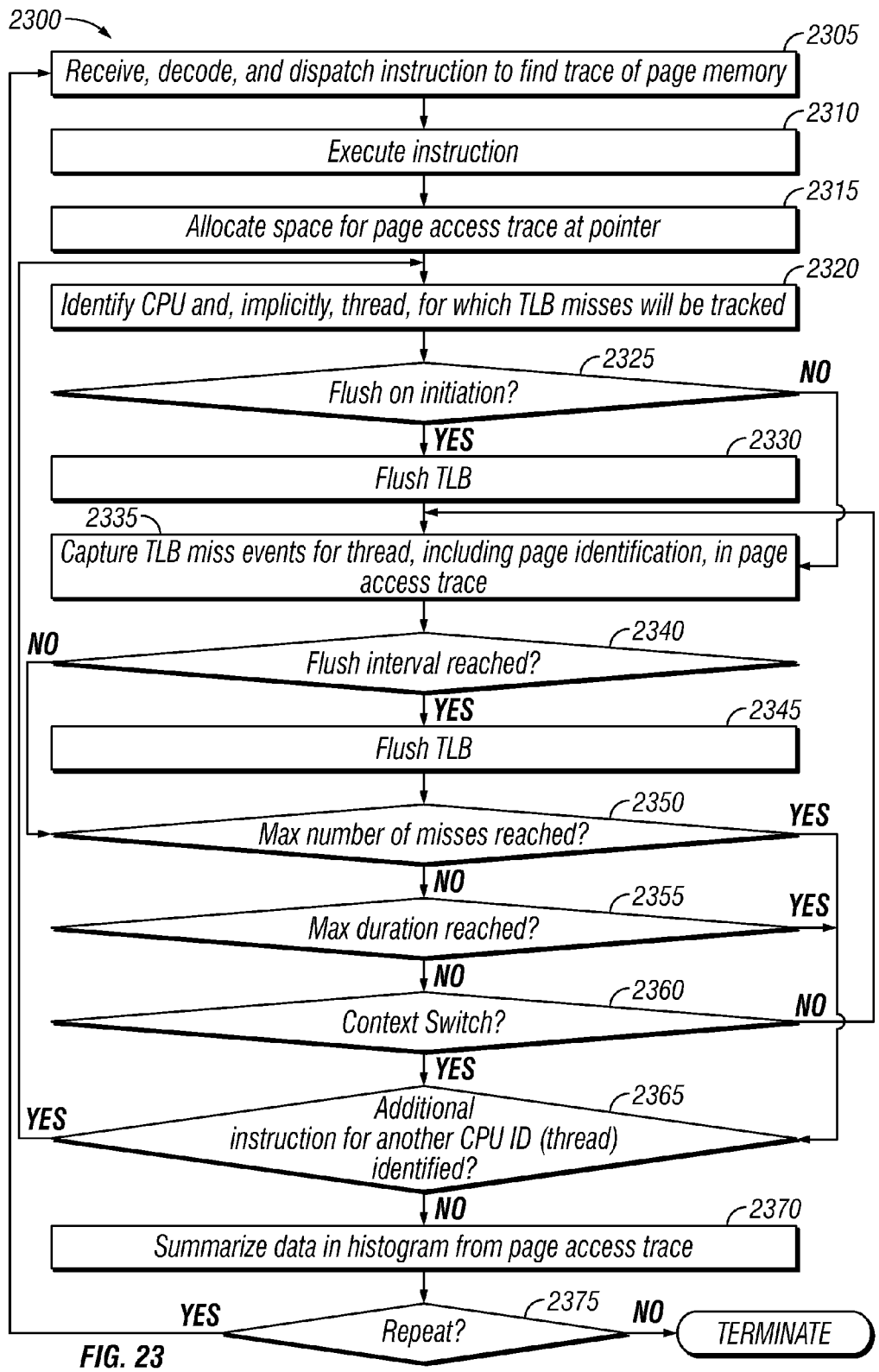
FIG. 23 is an illustration of another method for characterization of data accesses, according to embodiments of the present disclosure.

FIG. 23 is an illustration of another method 2300 for characterization of data accesses, according to embodiments of the present disclosure. Method 2300 may be implemented by any of the elements shown in FIGS. 1-21. Method 2300 may be initiated by any suitable criteria and may initiate operation at any suitable point. In one embodiment, method 2300 may initiate operation at 2305. Method 2300 may include greater or fewer steps than those illustrated. Moreover, method 2300 may execute its steps in an order different than those illustrated below. Method 2300 may terminate at any suitable step. Moreover, method 2300 may repeat operation at any suitable step.

Method 2300 may be performed subsequent to performance of method 2200, wherein specific pages of memory will be traced, wherein the pages were identified as including relatively significant amounts of activity when compared to other pages.

At 2305, an instruction to find a trace of page memory may be received, decoded, and dispatched. In one embodiment, the trace of page memory may be found by logging TLB misses. At 2310, the instruction may be executed. At 2315, space for page access traces from the TLB misses may be allocated at a pointer specified in the instruction call.

At 2320, the logical CPU on which TLB misses will be tracked may be identified through a specified parameter in the instruction. In one embodiment, a thread for which TLB misses will be tracked may be implicitly designated by the logical CPU.

In one embodiment, at 2325 it may be determined whether the TLB should be flushed upon initiation of the instruction's execution. If so, method 2300 may proceed to 2330. Otherwise, method 2300 may proceed to 2235. At 2330 the TLB may be flushed.

In one embodiment, at 2335 TLB miss events may be captured for the thread. The events may include information such as page identification. The capture may be stored in a page access trace allocated for the results. Miss events may continue to be captured.

In one embodiment, method 2300 may determine whether a flush interval, defined in a number of cycles, has been reached. If so, method 2300 may proceed to 2345 where the TLB may be flushed.

At 2350, 2355, and 2360, it may be determined whether data will continue to be logged. In one embodiment, at 2350 it may be determined whether a maximum number of misses has been reached. If so, method 2000 may proceed to 2365. In another embodiment, at 2355 it may be determined whether a maximum duration has been reached. This may be defined in terms of cycles or time. If so, method 2000 may proceed to 2365 and the value of the number of misses may be written to a register. In yet another embodiment, at 2360 it may be determined whether a context switch has been performed. If so, method 2300 may proceed to 2365. If the maximum number of misses has not yet been encountered, if the maximum time or cycle duration has not been reached, and if there has been no context switch, method 2300 may repeat at, for example, 2335.

At 2365, in one embodiment it may be determined whether there are additional instructions for other threads, identified by logical CPU identifiers. The additional instructions could include additional instructions for the same logical CPU after a context switch. If there are additional instructions, they may be received, decoded, dispatched, and executed as method 2300 returns to 2320. Otherwise, method 2300 may proceed to 2370.

At 2370, the collected data in the traces of page memory may be collected, summarized, and analyzed. The data may be presented or stored, for example, in a histogram or chart indexed by page number. At 2375, method 2300 may repeat at 2305 or terminate. The instructions may be retired at a suitable time after their execution.

The results of method 2300 may indicate that particular pages require additional analysis. The additional analysis may be performed, for example, by method 2400.

Figure 24:
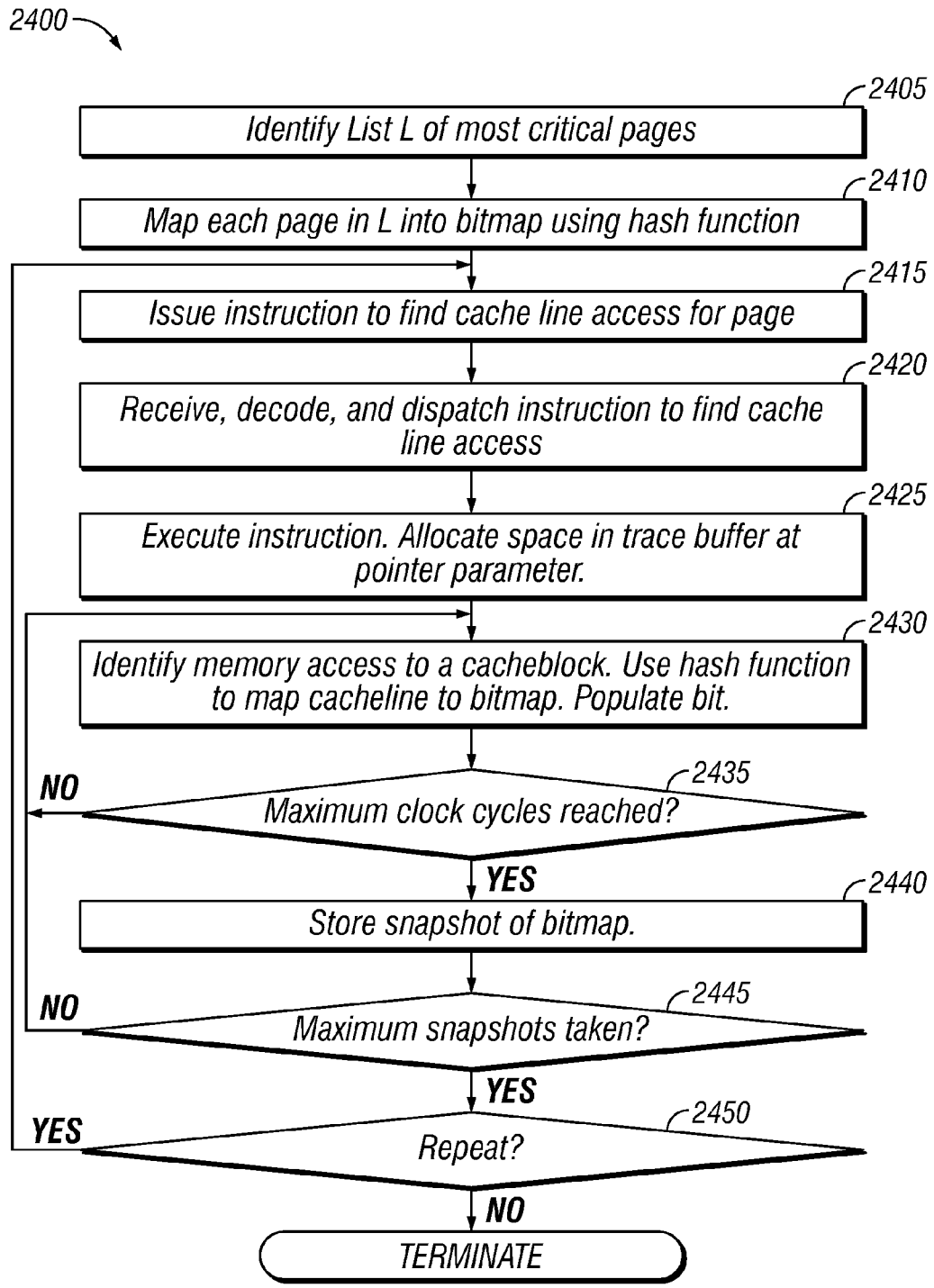
FIG. 24 is an illustration of yet another method for characterization of data accesses, according to embodiments of the present disclosure.

FIG. 24 is an illustration of another method 2400 for characterization of data accesses, according to embodiments of the present disclosure. Method 2400 may be implemented by any of the elements shown in FIGS. 1-21. Method 2400 may be initiated by any suitable criteria and may initiate operation at any suitable point. In one embodiment, method 2400 may initiate operation at 2405. Method 2400 may include greater or fewer steps than those illustrated. Moreover, method 2400 may execute its steps in an order different than those illustrated below. Method 2400 may terminate at any suitable step. Moreover, method 2400 may repeat operation at any suitable step.

Method 2400 may be invoked after performance of methods 2200 or 2300. Such methods 2200, 2300 may have identified pages that require more in-depth analysis.

At 2405, a list L of the most critical pages, identified perhaps by methods 2200 or 2300, may be identified from characterization data. The most critical pages may include those with the most activity. A certain number of pages, such as 512, may be selected. At 2410, each page of L may be mapped into a bitmap using a hash function. The bitmap may include 512 entries, one for each possible page.

At 2415, an instruction may be issued to find cache line access for a given page. The instruction may be issued to a core or processor.

At 2420, the instruction may be received, decoded, and dispatched for execution. In one embodiment, the instruction may be to find cache line access in the given page.

At 2425, in one embodiment the instruction may be executed. Space in a trace buffer may be allocated for the results. The trace buffer may be defined by a pointer parameter of the instruction.

At 2430, in one embodiment, memory access to a cache-block may be recognized. A hash function may be used to identify the page and the cacheline accessed. In a further embodiment, a bit corresponding to the accessed cacheline and page may be set in the bitmap.

At 2435, it may be determined whether a maximum number of clock cycles specified in the instruction have been reached. If not, method 2400 may return to, for example, 2430. Otherwise, at 2440 a snapshot of the bitmap may be stored.

At 2445, it may be determined whether the maximum number of snapshots specified in the instruction has been reached. If so, method 2400 may proceed to 2450. If not, method 2400 may return to 2430.

At 2450, it may be determined whether additional instructions are to be executed. If so, method 2400 may repeat at 2415. Moreover, method 2400 may be generally repeated if necessary. Instructions may be retired after execution. Otherwise, method 2400 may terminate.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include a front end with circuitry to receive an instruction, a decode stage with circuitry to decode the first instruction, a core with circuitry to execute the first instruction, and a retirement unit to retire the first instruction. The core may include logic to repeatedly record a translation lookaside buffer. The recording may be repeated until a designated number of records are determined. The core may also include logic to flush the TLB after a flush interval. In further embodiments, the records may characterize access of memory pages. In combination with any of the above embodiments, the core may include logic to provide the records as a characterization of access of memory pages. In combination with any of the above embodiments, the core may include logic to obtain a size of the TLB to store the designated number of records. In combination with any of the above embodiments the core may receive and execute another instruction, and include logic to determine a page trace from access related to the TLB. In combination with any of the above embodiments, the core may include logic to record a TLB miss. In combination with any of the above embodiments, the core may include logic to determine a page trace from the TLB miss. In combination with any of the above embodiments, the core may include logic to log cacheline access in a page of memory to a bitmap indexed by pages of memory. In combination with any of the above embodiments, the core may log cacheline accesses in a page of memory to a bitmap indexed by pages of memory until a specified number of cacheline accesses are logged. In combination with any of the above embodiments, the core may include logic to store the bitmap. In combination with any of the above embodiments, the core may include logic to clear the bitmap. In combination with any of the above embodiments, the core may include logic to repeat the log of cacheline accesses until another specified number of cacheline accesses are logged. In combination with any of the above embodiments, the core may include logic to provide a page trace based upon the bitmap.

Some embodiments of the present disclosure include a method. The method may be for executing instructions. An instruction may be received, executed, and retired. Execution of the instruction may include repeatedly recording a TLB until a designated number of records is determined. In some embodiments, the TLB may be flushed after a flush interval. In combination with any of the above embodiments, the records may be provided as a characterization of access of memory pages. In combination with any of the above embodiments, the method may include obtaining a size of the TLB to store the designated number of records. In combination with any of the above embodiments, the method may include determining a page trace from access related to the TLB. In combination with any of the above embodiments, the method may include executing a second instruction. This may include recording a TLB miss and determining a page trace from the TLB miss. In combination with any of the above embodiments, the method may include logging cacheline access in a page of memory to a bitmap indexed by pages of memory. In combination with any of the above embodiments, the method may include logging cacheline accesses in a page of memory to a bitmap indexed by pages of memory until a specified number of cacheline accesses are logged. In combination with any of the above embodiments, the method may include storing the bitmap, clearing the bitmap, and repeating the log of cacheline accesses until another specified number of cacheline accesses are logged. In combination with any of the above embodiments, the method may include Some embodiments of the present disclosure include a system. In at least some of these embodiments, the processor may include a front end with circuitry to receive an instruction, a decode stage with circuitry to decode the first instruction, a core with circuitry to execute the first instruction, and a retirement unit to retire the first instruction. The core may include logic to repeatedly record a translation lookaside buffer. The recording may be repeated until a designated number of records are determined. The core may also include logic to flush the TLB after a flush interval. In further embodiments, the records may characterize access of memory pages. In combination with any of the above embodiments, the core may include logic to provide the records as a characterization of access of memory pages. In combination with any of the above embodiments, the core may include logic to obtain a size of the TLB to store the designated number of records. In combination with any of the above embodiments the core may receive and execute another instruction, and include logic to determine a page trace from access related to the TLB. In combination with any of the above embodiments, the core may include logic to record a TLB miss. In combination with any of the above embodiments, the core may include logic to determine a page trace from the TLB miss. In combination with any of the above embodiments, the core may include logic to log cacheline access in a page of memory to a bitmap indexed by pages of memory. In combination with any of the above embodiments, the core may log cacheline accesses in a page of memory to a bitmap indexed by pages of memory until a specified number of cacheline accesses are logged. In combination with any of the above embodiments, the core may include logic to store the bitmap. In combination with any of the above embodiments, the core may include logic to clear the bitmap. In combination with any of the above embodiments, the core may include logic to repeat the log of cacheline accesses until another specified number of cacheline accesses are logged. In combination with any of the above embodiments, the core may include logic to provide a page trace based upon the bitmap.

Some embodiments of the present disclosure include a system for executing instructions. In at least some of these embodiments, the system may include means to receive an instruction, decode the first instruction, execute the first instruction, and retire the first instruction. The system may include means to repeatedly record a translation lookaside buffer. The recording may be repeated until a designated number of records are determined. The system may also include means to flush the TLB after a flush interval. In further embodiments, the records may characterize access of memory pages. In combination with any of the above embodiments, the system may include means to provide the records as a characterization of access of memory pages. In combination with any of the above embodiments, the system may include means to obtain a size of the TLB to store the designated number of records. In combination with any of the above embodiments the system may include means to receive and execute another instruction, and include logic to determine a page trace from access related to the TLB. In combination with any of the above embodiments, the system may include means to record a TLB miss. In combination with any of the above embodiments, the system may include means to determine a page trace from the TLB miss. In combination with any of the above embodiments, the system may include means to log cacheline access in a page of memory to a bitmap indexed by pages of memory. In combination with any of the above embodiments the system may include means to log cacheline accesses in a page of memory to a bitmap indexed by pages of memory until a specified number of cacheline accesses are logged. In combination with any of the above embodiments, the system may include means to store the bitmap. In combination with any of the above embodiments, the system may include means to clear the bitmap. In combination with any of the above embodiments, the system may include means to repeat the log of cacheline accesses until another specified number of cacheline accesses are logged. In combination with any of the above embodiments, the system may include means to provide a page trace based upon the bitmap.

What is claimed is:

1. A processor, comprising:
   a front end to receive a first instruction;
   a decoder to decode the first instruction;
   a core to execute the first instruction, wherein the first instruction is executed to:
      record a set of snapshots of a translation lookaside buffer (TLB), wherein each of the set of snapshots describes contents of the TLB at a respective time, and snapshots of the TLB are to be added to a memory until a designated number of snapshots are recorded; and
      determine whether a flush interval is met; and
      flush the TLB when the flush interval is determined to be met; and
   a retirement unit to retire the first instruction.

2. The processor of claim 1, wherein the core comprises logic to obtain a size of the TLB to store the designated number of records.

3. The processor of claim 1, wherein the core is further to execute a second instruction to determine a page trace from access related to the TLB.

4. The processor of claim 1, wherein the core is further to execute a second instruction to record a TLB miss.

5. The processor of claim 1, wherein the core is further to execute a second instruction to log cacheline access in a page of memory to a bitmap indexed by pages of memory.

6. The processor of claim 1, wherein the core is further to execute a second instruction to:
   log cacheline accesses in a page of memory to a bitmap indexed by pages of memory until a specified number of cacheline accesses are logged;
   store the bitmap in memory;
   clear the bitmap; and
   repeat the log of cacheline accesses until another specified number of cacheline accesses are logged.

7. The processor of claim 1, wherein the core is further to execute a second instruction to:
   log cacheline access in a page of memory to a bitmap indexed by pages of memory; and
   provide a page trace based upon the bitmap.

8. A method, comprising:
   receiving a first instruction;
   decoding the first instruction;
   executing the first instruction, including:
      recording a set of snapshots of a translation lookaside buffer (TLB), wherein each of the set of snapshots describes contents of the TLB at a respective time, and snapshots of the TLB are to be added to a memory until a designated number of snapshots are recorded;
      determining whether a flush interval associated with the TLB is met; and
      flushing the TLB when the flush interval is determined to be met; and
   retiring the first instruction.

9. The method of claim 8, further comprising obtaining a size of the TLB to store the designated number of records.

10. The method of claim 8, further comprising determining a page trace from access related to the TLB.

11. The method of claim 8, further comprising executing a second instruction, including recording a TLB miss.

12. The method of claim 8, further comprising executing a second instruction, including logging cacheline access in a page of memory to a bitmap indexed by pages of memory.

13. The method of claim 8, further comprising executing a second instruction, including:
  logging cacheline accesses in a page of memory to a bitmap indexed by pages of memory until a specified number of cacheline accesses are logged; storing the bitmap;
  clearing the bitmap; and
  repeating the log of cacheline accesses until another specified number of cacheline accesses are logged.

14. A system, comprising:
  a front end to receive a first instruction;
  a decoder to decode the first instruction;
  a core to execute the first instruction, wherein the first instruction is executed to:
    record a set of snapshots of a translation lookaside buffer (TLB), wherein each of the set of snapshots describes contents of the TLB at a respective time, and snapshots of the TLB are to be added to a memory until a designated number of snapshots are recorded; and
    determine whether a flush interval is met; and
    flush the TLB when the flush interval is determined to be met; and
  a retirement unit to retire the first instruction.

15. The system of claim 14, wherein the core is to obtain a size of the TLB to store the designated number of records.

16. The system of claim 14, wherein the core is further to execute a second instruction to determine a page trace from access related to the TLB.

17. The system of claim 14, wherein the core is further to execute a second instruction to record a TLB miss.

18. The system of claim 14, wherein the core is further to execute a second instruction to log cacheline access in a page of memory to a bitmap indexed by pages of memory.

19. The system of claim 14, wherein the core is further to execute a second instruction to:
  log cacheline accesses in a page of memory to a bitmap indexed by pages of memory until a specified number of cacheline accesses are logged;
  store the bitmap;
  clear the bitmap; and
  repeat the log of cacheline accesses until another specified number of cacheline accesses are logged.

20. The system of claim 14, wherein the core is further to execute a second instruction to:
  log cacheline access in a page of memory to a bitmap indexed by pages of memory; and
  provide a page trace based upon the bitmap.

* * * * *